(12) United States Patent
Meins et al.

(10) Patent No.: US 6,515,878 B1
(45) Date of Patent: Feb. 4, 2003

(54) METHOD AND APPARATUS FOR SUPPLYING CONTACTLESS POWER

(76) Inventors: Jürgen G. Meins, Am Hasengarten 18, 38126 Braunschweig (DE); John D. Sinsley, 3 Pinto Ct., Pinehurst, NC (US) 28374

(*) Notice: Subject to any disclaimer, the term of this patent is extended or adjusted under 35 U.S.C. 154(b) by 0 days.

(21) Appl. No.: 09/131,074

(22) Filed: Aug. 7, 1998

Related U.S. Application Data
(60) Provisional application No. 60/054,937, filed on Aug. 8, 1997.

(51) Int. Cl.[7] ............................................. H02M 5/458
(52) U.S. Cl. ........................ 363/37; 307/10.1; 191/10
(58) Field of Search ............................ 363/37, 34, 123; 307/10.1; 336/118, 119; 191/6, 10

(56) References Cited

U.S. PATENT DOCUMENTS

| | | | | |
|---|---|---|---|---|
| 5,293,308 A | * | 3/1994 | Boys et al. ................ 324/392 |
| 5,341,083 A | * | 8/1994 | Klonz et al. .................... 320/2 |
| 5,619,078 A | * | 4/1997 | Boys et al. .................... 307/85 |
| 5,669,470 A | * | 9/1997 | Ross .............................. 191/10 |
| 5,737,211 A | * | 4/1998 | Hirai et al. ................. 363/144 |
| 5,831,841 A | * | 11/1998 | Nishino ........................ 363/37 |

* cited by examiner

Primary Examiner—Robert E. Nappi
Assistant Examiner—Gary L. Laxton
(74) Attorney, Agent, or Firm—Robert M. Storwick

(57) ABSTRACT

A method and apparatus for supplying contactless power. Electrical power is transferred from a power source to a load through a primary energy converter that can be connected to the power source, through a primary inductive loop connected to the primary energy converter and a secondary pickup coil magnetically coupled to the primary inductive loop, and then to a secondary energy converter. The power factor for the transfer of electrical energy is one. Multiple loads can receive power from the power source and, where the loads are located in zones, collisions between the loads can be prevented.

4 Claims, 28 Drawing Sheets

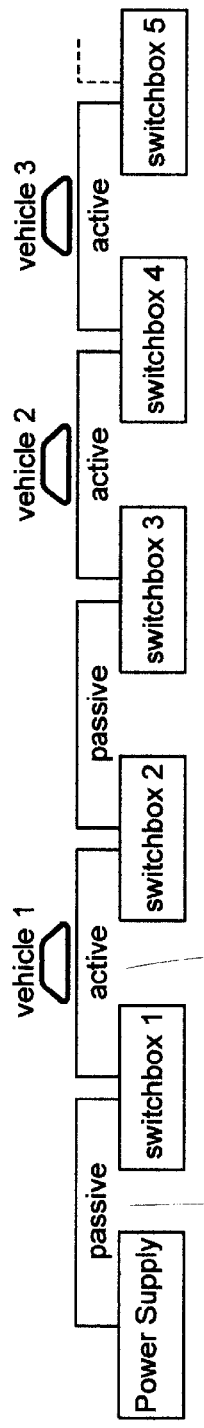
*Figure 12A*
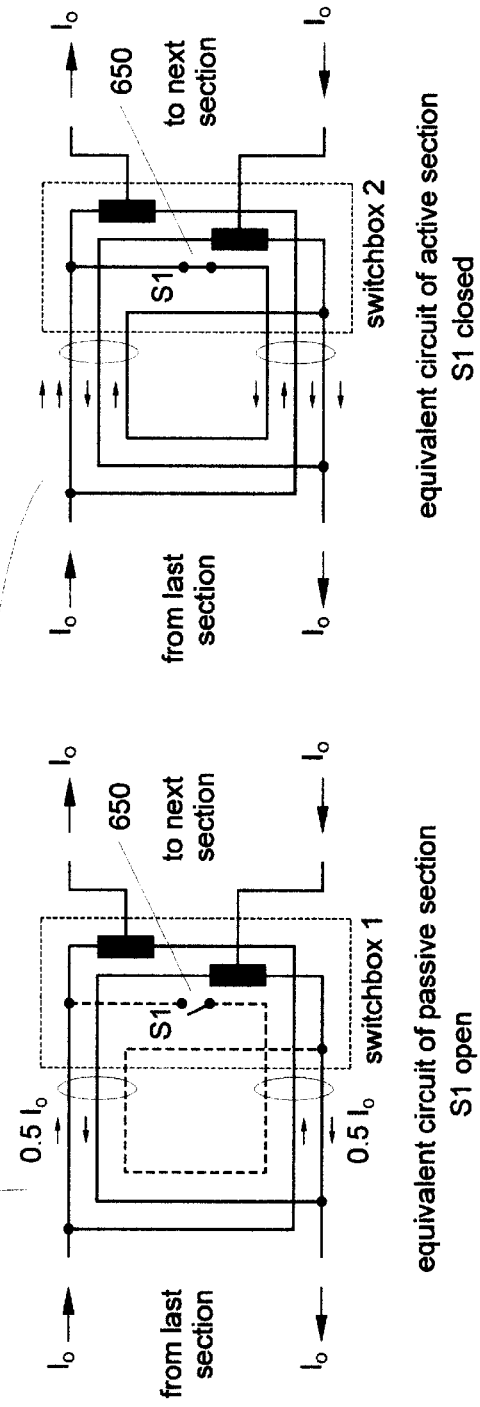
*Figure 12B*
*Figure 12C* detailed circuit of active section

CONTINUOUS CONSTANT OUTPUT CURRENT BY VARIABLE INVERTER PULSE CONTROL

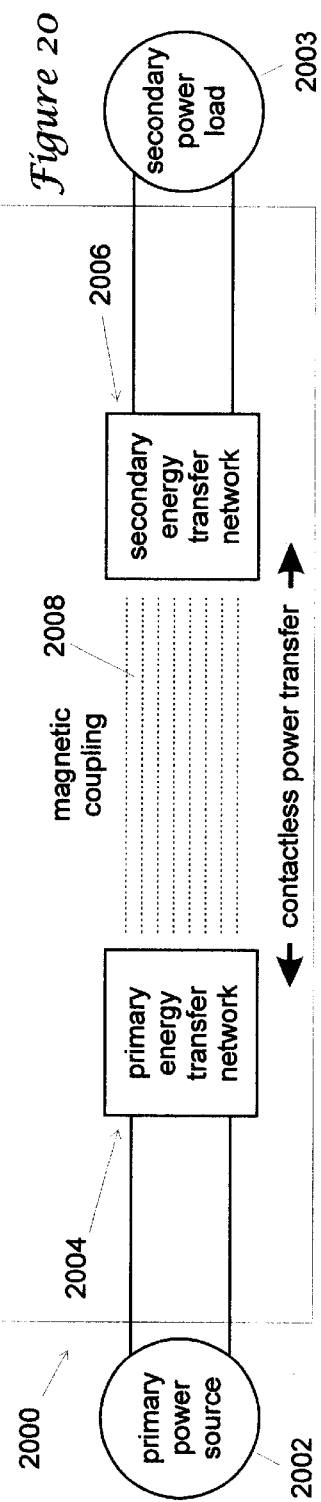
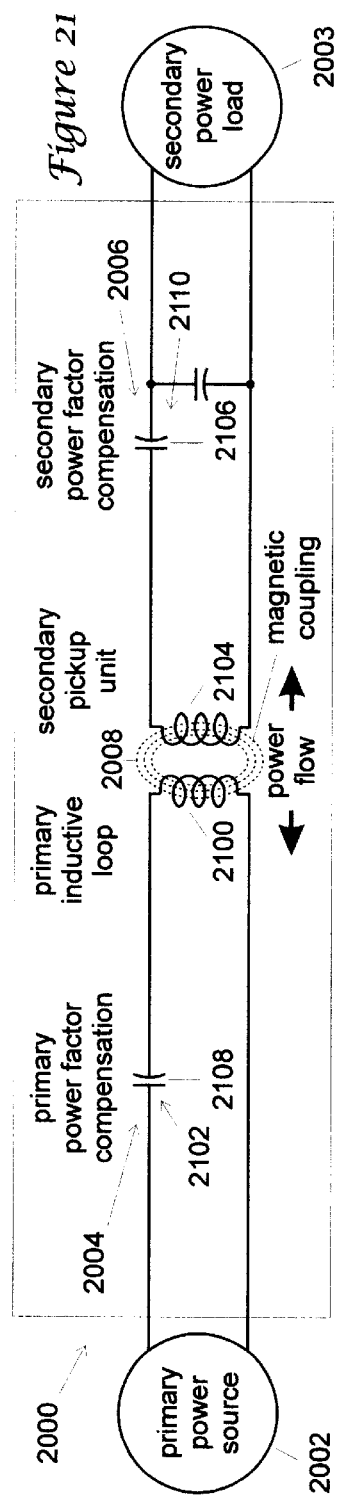
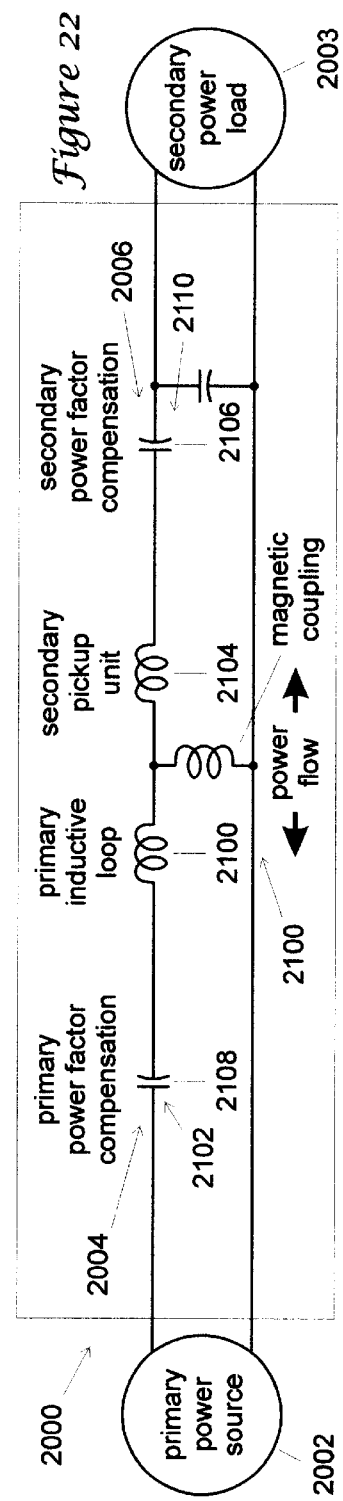

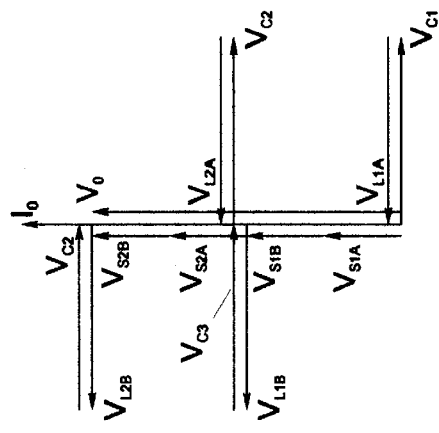
*Figure 31A*
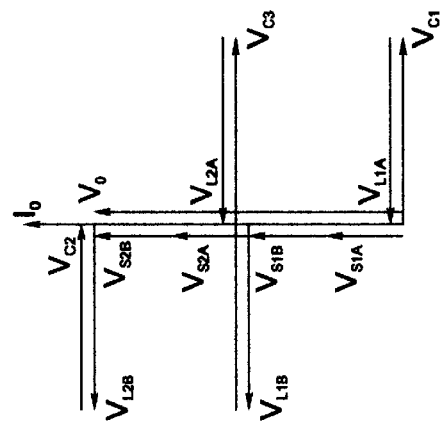
*Figure 31B*
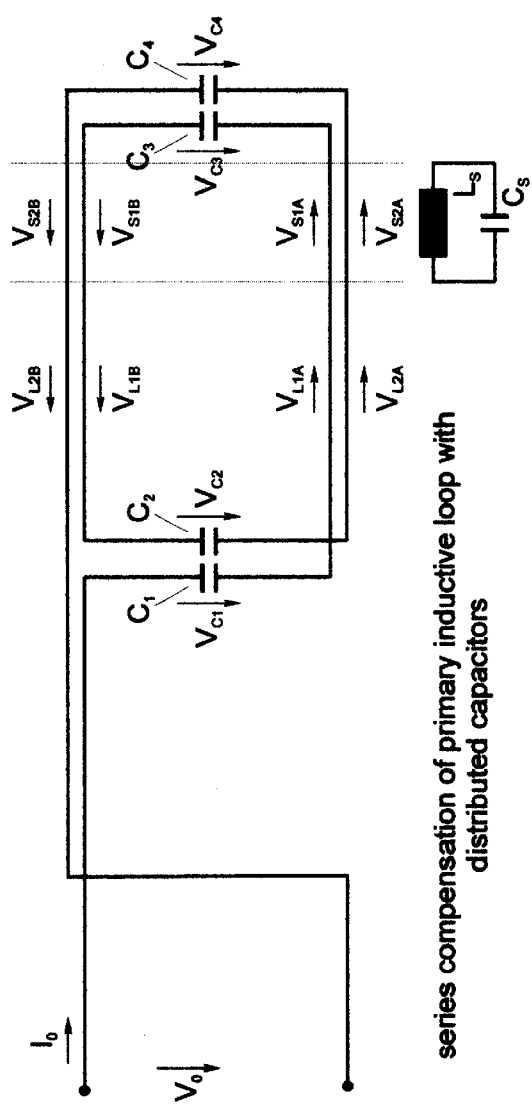
series compensation of primary inductive loop with distributed capacitors
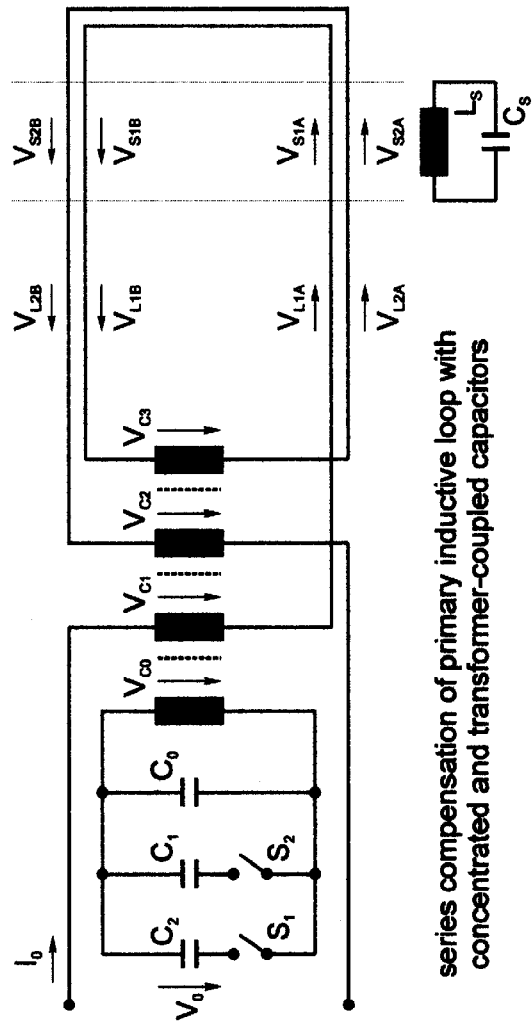
series compensation of primary inductive loop with concentrated and transformer-coupled capacitors

METHOD AND APPARATUS FOR SUPPLYING CONTACTLESS POWER

REFERENCE TO PROVISIONAL APPLICATION

This application claims the benefit of the U.S. Provisional Application No. 60/054,937, filed Aug. 8, 1997.

TECHNICAL FIELD

The present invention relates to electrical power distribution systems, and more particularly, to methods and apparatus for contactless transfer (especially magnetic transfer) of electric power from primary electric conductors to secondary pick-up coils.

BACKGROUND OF THE INVENTION

In many applications, passenger and cargo transport systems such as trains or monorails carry electric rotating or linear motors to provide propulsion. The motors for such systems generally have brushes for proper distribution of the electric energy within the motors. The electric power is produced by power supplies. In addition, the power supplies for these transport systems usually use either on-board batteries or pantographs that draw electric power to the transport system from conductors that parallel the route of the transport systems. The electric power can also be supplied by means of busbars with sliding contact-type current collectors, flexible-cable festoon systems, or cable reels, as well as other cable handling devices.

Many applications impose extraordinarily strenuous operating conditions. These include the need for higher speed and/or acceleration, complex track configurations, and difficult environmental conditions.

Battery life limits the utility of battery-powered transport systems. Sparking, noise and high installation costs limit the utility of pantographs and/or the motors. Wear and tear and maintenance costs limit the utility of all of the passenger transport systems described above because they are unreliable and maintenance intensive.

The difficult environmental conditions make conventional transport systems vulnerable to water, wind, snow and ice, as well as explosive atmosphere, dirt and other possible ambient situations. In addition, conventional transport systems can be hazardous in operation, producing, for example, arcing and sparking, as well as being electrically charged and, therefore, not touch-proof.

Contactless inductive power transfer offers an attractive alternative to the transport systems described above because it is free of sparking, wear and tear and hazardous operation. Such power transfer is also safe, quiet and marked by a high reliability. Further, contactless inductive power transfer offers unlimited speed and acceleration. Prior art proposals of contactless inductive power transfer systems have not resulted in a wide usage of contactless power transfer because satisfactory inductive transfer of electric power can only be accomplished by taking additional factors into account.

In the prior art, a number of patents have issued to disclosing inductive electric power transfer to moving devices. Generally all of these prior art patents describe the transfer of small quantities of electric power since a relatively high quantity of apparent power is required as a consequence of the large air gap in such prior art systems.

There have also been a number of patents describing motive energy transfer (for example, Tesla, in U.S. Pat. No. 514,972). However, the historic patent that is the most relevant to the present invention is that of Hutin, et al. (U.S. Pat. No. 527,857) which, in 1984, described the use of alternating current induction at approximately 3 kHz. In 1974, Otto (in New Zealand Patent Number 167,422) suggested a practical solution for inductive power transfer using a series resonant secondary winding operating in the range of 4 to 10 kHz for the inductive power transfer to a moving vehicle.

In 1994 Boys and Green (U.S. Pat. No. 5,293,308) suggested another practical system for one-way inductive power transfer, using the results of Otto with regard to the resonant secondary winding and adding some devices to improve the transfer characteristics. The Boys-Green system adds a capacitor in parallel to the primary. This method reduces the required apparent power but has at least two disadvantages. One disadvantage is that the point of compensation varies with the secondary load. The power factor of this and other prior art systems is load-dependent and never equals unity. The other disadvantage of the Boys-Green system is that a large amount of reactive power circulates in the primary, resulting in high primary losses and lower efficiencies which are unfortunately nearly independent of the transferred power. To reduce the effects of these disadvantages, Boys, et al. suggest tuning a primary parallel capacitor at a ringing frequency that depends on, and is disturbed by, the secondary load conditions. Consequently, only limited amounts of real power can be transferred in these prior art systems, leading to their marginal utility. Boys, et al. also suggest using Litz cable for the primary in order to reduce the losses in the primary. Further suggestions reflect the need for special design of control and hardware components to achieve other and less no important power transfer characteristics. For example, complex primary-secondary magnetic decoupling is required for multiple secondaries, and complex primary segmenting and tuning design results in system constraints.

In 1993 Nishino and Boys (New Zealand patent application NZ93/00032) suggested forming the primary from a number of modules that are pre-tuned primary segments connected in series. Linking poles with the same polarity with a non-inductive cable tends to constrain their system, limiting the possible resonant frequencies.

SUMMARY OF THE INVENTION

The present invention provides an improved system for the inductive (magnetic) transfer of large quantities of electric power due to its high efficiency, simple design and low installation costs. It accomplishes this, in part, through its novel pickup coil design, unique power factor compensation and power transfer circuitry, and reverse power flow capability. The invention is applicable to systems which include AC or DC sources and one or more AC and/or DC, active and/or passive secondary loads. The simplified design of the invention accommodates the use of standard components and thereby reduces the installed cost for typical applications.

The inventive contactless power system (CPS) overcomes the following limitations, among others: it provides forward and reverse power transfer capability; it has a unity power factor under all load conditions; it applies only real power to the primary, leading to higher efficiency and greater power transfer capability; the quantity of transferred power is limited only by the primary capacity; primary-secondary magnetic decoupling is not required for multiple secondaries; and it has a simple primary geometry without any system constraints.

The inventive system has a large number of aspects. It is a universal contactless power system which magnetically transfers large quantities of in-phase (i.e., power factor=1) electrical power bidirectionally between an AC or DC primary source and one or more AC and/or DC secondary loads which are active and/or passive.

The inventive system has a distributed-winding pickup coil that improves primary-secondary magnetic coupling, which increases efficiency and permits greater power transfer. The pickup coil has parallel compensation, and consists of either fixed resonant parallel capacitors or parallel capacitors with additional adaptive compensation. This additional adaptive compensation transfers in-phase power to the load at a constant voltage, regardless of the magnetic or state (i.e., consuming or generating) of the load. In contrast to the prior art and as an additional aspect, the present invention uses a new pickup coil design that consists of two windings which are partly magnetically coupled and partly magnetically not coupled. The two windings are each distributed on the middle yoke and a distinct one of the side yokes of a ferromagnetic core, leading to significantly improved magnetic coupling and power transfer efficiency between the primary inductive loop and the pickup coil.

In another aspect of this invention, the two windings of the pickup coil are each connected to a parallel resonant capacitor and compensated to unity power factor.

In another aspect of the invention, the parallel capacitors partly compensate the windings and additional components adaptively compensate the collective windings to unity power factor and automatically supply in-phase power to the secondary load at a constant voltage regardless of the magnitude of the load.

The inventive system also offers series compensation of the primary loop, which results in a constant unity power factor under all load conditions and increases efficiency and permits greater power transfer. This compensation is accomplished through distributed series capacitors, or with concentrated transformer-coupled capacitors.

In contrast to the prior art and as an additional aspect of this invention, the primary inductive loop is compensated to unity power factor with one or more series capacitors and consequently the present invention does not require any reactive power circulating in the primary loop; rather, the power applied to the primary and magnetically transferred to the secondary is always at unity power factor.

The reverse power control provided by the inventive system allows reverse power from an active load to be transferred back through the pickup coil to the primary and then fed back into the line or to other intermediate consumers.

The pickup coils of the inventive system can be connected in parallel at their DC output for greater power transfer.

The inventive system can also provide a primary constant current control, which allows power transfer to multiple secondaries without the need to magnetically decouple the secondaries from the primary. This can be accomplished by pulse control of the primary output inverter.

The inventive system can further provide primary constant voltage control, which allows current to rise and fall with the magnitude of the secondary load, and to fall to the magnetization level when the load is zero. This increases efficiency and permits greater power transfer.

In addition, the inventive system can have parallel primary conductors, which increases the ampere-turns of the primary inductive loop and thereby provides greater power transfer. This can be accomplished through current balancing, which minimized losses and increases efficiency.

The inventive system can also have a three-phase primary inductive loop and a secondary pickup coil for greater power transfer. This can be accomplished through a three-phase primary output inverter and a three-phase secondary input inverter.

The inventive system can also offer a branch secondary configuration, in which applications involving additional motion axes can be powered from a single primary system.

Additionally, the inventive system can provide multiple primary zones, which are switchable between magnetically active and magnetically neutral. This allows power transfer only when a zone is magnetically active and, consequently, increases system safety and efficiency. Zone control can allow only one load per zone and consequently places all secondaries in parallel so that all secondaries have a common constant voltage source and additionally ensures that any one secondary cannot physically be in contact with any other secondary. This is an anti-collision system.

The inventive system can also provide multiple primary output inverters with load-share switching to multiple primary inductive loops, parallel primary inverter bridges for greater power transfer, and a primary inductive loop made of non-Litz standard industrial cable.

In one aspect, and in its most general form, the invention is a contactless system to magnetically transfer in-phase electric power between a primary source and a secondary load. The system includes a primary energy converter, a primary energy transfer network which is magnetically coupled to a secondary energy transfer network, and a secondary energy converter.

In accordance with one aspect, the invention is a contactless system to magnetically transfer electric power from an input power source to a secondary load. the system includes a primary energy converter, a primary inductive loop, a secondary pickup coil, and a secondary energy converter. The primary energy converter is connectable to the input power source and includes an output inverter. The primary inductive loop is connected to the output inverter and includes at least one turn which is compensated to unity power factor. The secondary pickup coil is magnetically coupled to the primary inductive loop and compensated to unity power factor. The secondary energy converter is connected to the secondary pickup coil, includes an input inverter, and is connectable to the secondary load.

In another aspect, the invention is a contactless magnetic system to transfer in-phase electric power from a primary source to multiple secondary loads.

In another aspect, the invention is a contactless magnetic system to transfer in-phase electric power bidirectionally between a primary source and one or more active secondary loads.

In another aspect of the invention, one or more identical pickup coils are connected in parallel at their respective DC outputs to increase the total output power.

In further aspects of the invention, the series compensation of the primary inductive loop is accomplished either by distributed series capacitors or by concentrated transformer-coupled capacitors. The latter method eliminates multiple compensation locations and eases compensation adjustment.

In contrast to the prior art and as another aspect of this invention, the secondary power controller includes reverse power control which senses the state of the active load and controls the flow of reverse power when the load is in a generating state. The reverse power is transferred back to the primary where it is fed back into the line or, alternatively, to other intermediate consumers.

In contrast to the prior art and as a further aspect of this invention, the primary power controller includes constant current control which enables power transfer to multiple secondary loads without the need to decouple the secondary pickup coils from the primary inductive loop.

In another aspect of this invention, the primary constant current control is accomplished via variable pulse control of the primary output inverter.

In contrast to the prior art and as another aspect of this invention, power is supplied to the primary inductive loop at a constant voltage and unity power factor. The magnitude of the primary current is determined by the magnitude of the load and drops to the magnetization level when the load is zero.

As another aspect of the invention, the primary inductive loop is comprised of multiple parallel turns which are current-balanced. The ampere-turns of the primary and thus the power transfer is increased.

As additional aspects of the invention, the primary inductive loop and secondary pickup coil magnetically couple three-phase power and the primary output inverter and secondary input inverter are three-phase bridges.

In yet another aspect of the invention, the secondary energy converter feeds an auxiliary inductive loop which is coupled to an auxiliary pickup coil and energy converter. This arrangement allows power transfer to equipment operating in multiple axes such as the bridge and trolley of an overhead crane.

In another aspect of the invention, the primary inductive loop is configured into multiple zones which can be switched between magnetically active and magnetically neutral such that power can be magnetically transferred to a secondary only when the zone is magnetically active. In yet another aspect of the invention, control means is included to permit only one load to be located in any one zone, thereby placing all loads in parallel and preventing the physical collision of one load with another.

In another aspect of the invention, multiple primary energy converters are connected to multiple primary inductive loops in a manner which allows one primary energy converter to feed more than one primary loop through a switching arrangement. By this configuration a primary energy converter may be taken out of service without disrupting power transfer to the overall system.

In another aspect of the invention, the primary energy converter utilizes parallel output inverter bridges to increase the primary power for greater power transfer.

In another aspect of the invention, the primary inductive loop is made of conventional industrial cable (non-Litz) which is made possible by the high efficiency of the invention.

The contactless transfer of electric power disclosed in the application occurs over a large air gap whose separation is measured in the range of centimeters. The physical principle of the disclosed invention is based on Maxwell's laws as they relate to alternating magnetic fields.

Although only one or a few specific applications of this invention will be disclosed in the application, the fields of application generally involve the transfer of power to moving or parked equipment such as commercial or industrial vehicles, cranes, elevators, material handling systems, machine tools, and other similar equipment.

In accordance with one aspect, the invention is a contactless inductive system to transfer electric power to a first load. The system includes a first pick-up coil, a primary, a first AC-inverter, and a constant current controlled chopper. The first pick-up coil is tuned at a ringing frequency. The primary is formed as a loop. It is also connected with one or more capacitors in series, and tuned at the ringing frequency.

The first AC-inverter is also tuned at the ringing frequency. The first AC-inverter feeds the primary system with constant voltage or constant current and maintains its power factor equal to one, independent of the first load.

The constant current controlled chopper feeds the AC-inverter, so that the electric power transferred to the first load has a unity power factor.

In accordance with a further aspect, the invention is a contactless inductive system to transfer electric power from a primary system to a first load. The contactless inductive system includes a first pick-up coil, a primary, a first AC-inverter, and a constant current power supply. The first pick-up coil includes two windings which are partly magnetically coupled and partly magnetically decoupled. Each of the two windings are connected with a resonant capacitor in parallel, so that the pick-up coil is tuned at a ringing frequency.

The primary is formed as a loop and connected with one or more capacitors in series which are tuned at the ringing frequency.

The first AC-inverter is tuned at the ringing frequency, and feeds the primary system with constant voltage or constant current. The first AC-inverter also maintains its power factor equal to one, independent of the first load. The constant current power supply feeds the AC-inverter with electric power.

In accordance with yet another aspect, the invention is a contactless inductive system to transfer electric power between a first system and a second system. The first system is alternatively operable as a source of electric power and a consumer of electric power. The contactless inductive system includes a first coil and a second coil. The first and second coils are tuned at a ringing frequency.

The system also includes a first control circuit connected between the first coil and the first system, and a second control circuit connected between the second coil and the second system. The first and second control circuits are operable 1) to supply electric power to the second system when the first system is operable as a source of electric power and 2) to supply electric power to the first system when the first system is operable as a consumer of electric power.

In contrast to the prior art, the present invention uses a new pick-up coil design that consists of two windings which are partly magnetically coupled and partly magnetically decoupled, where each winding is connected to a resonant capacitor. In accordance with this invention, the two sides of the primary have a self-symmetry because they carry identical currents, but also allow different voltages along the pick-up coil. The total output power is generated by two full bridge rectifiers, each of which is assigned to a distinct one of the windings of the pick-up coil. In further accordance with the present invention, it is also possible to increase the DC-output power without connecting the two pick-up coil windings directly in parallel. (Connecting the two pick-up coil windings directly in parallel would lead to an unacceptable increase of pick-up losses due to different stray magnetic fields from the two windings of the pick-up coil.) Attempting to increase the DC-output power by using a larger cross-section cable has the disadvantage of increased eddy current losses and geometric limitations.

In a further aspect of the invention, the DC-output of one or more identical pick-up coils can be connected in parallel to increase the output power.

In yet another aspect of the invention, distributing each of the two windings of an inventive pick-up coil both on the middle yoke and a distinct one of the two side yokes leads to an increase of the magnetic coupling between the primary coil and the pick-up coil. This, in turn, means an increase of the efficiency of the coupling.

The primary coil of the system is fed with a constant current, thereby decoupling the various secondary loads which generally constitute a transport system. As a new aspect of the invention, a constant AC-current in the primary coil is generated by a current control circuit which is connected to a high frequency AC-output inverter. This arrangement keeps the power factor of the primary coil always at one regardless of the load, and leads to a minimum required voltage and minimal AC-output inverter installation costs. Additionally, the required current in the primary is minimized relative to the known prior art. Therefore, the eddy current losses in the primary are minimized so that no fine stranded Litz cable is required, but rather standard industrial Litz cable can be used.

The contactless transfer of electric power disclosed in the present application occurs over a large air gap whose separation is measured in the range of centimeters. The physical principle of the disclosed invention is based on Maxwell's laws as they relate to alternating magnetic fields. Although only one or a few specific applications of this invention will be disclosed in this application, the fields of application are generally moving or rotating power consumers, such as vehicles, cranes, elevators, material handling systems, and machinery tools.

According to still another aspect, the invention comprises:
- one or more pick-up coils that are 1) assigned to one or more secondary capacitors connected in parallel with the windings of the pick-up coils, 2) tuned to the ringing frequency of the coil, and 3) connected to one or more bridge rectifiers that are connected in parallel at the DC-output;
- a buck converter which is assigned to each secondary power consumer and used to keep the output voltage constant in case of different loads on the secondary;
- a primary cable which is formed as a loop and which includes one or more turns;
- one or more series capacitors which are connected in series to the primary and tuned at the ringing frequency;
- a high frequency AC-inverter which feeds the primary system with a constant voltage or a constant current; and
- a constant current controller which is required as a decoupling device in the case of multiple secondary power consumers.

The separation of the pick-up coil winding into two individual isolated windings which are partly magnetically coupled on a middle yoke of an E-shaped iron core and partly magnetically decoupled on the side yokes of the core leads to a number of advantages. Asymmetric effects due to individual stray fields do not lead to additional losses since the symmetry is self-adjusted because of the individual magnetic coupling of each pick-up coil winding with one side of the primary.

BRIEF DESCRIPTION OF THE DRAWINGS

FIGS. 12A–E are schematic diagrams of a preferred embodiment of the invention having a multiple-zone primary configuration.

FIG. 20 is a schematic diagram of the general principle of contactless power transfer between a primary power source and a secondary power load.

FIG. 21 is a schematic diagram of a first specific form of contactless power transfer between a primary power source and a secondary power load.

FIG. 22 is a schematic diagram of a transformer equivalent circuit for contactless power transfer using magnetically coupled primary and secondary energy transfer networks.

FIGS. 31A–B are schematic diagrams of additional aspects of the series compensation of the primary inductive loop of the present invention.

DETAILED DESCRIPTION OF THE PREFERRED EMBODIMENT OF THE INVENTION

Figure 1:
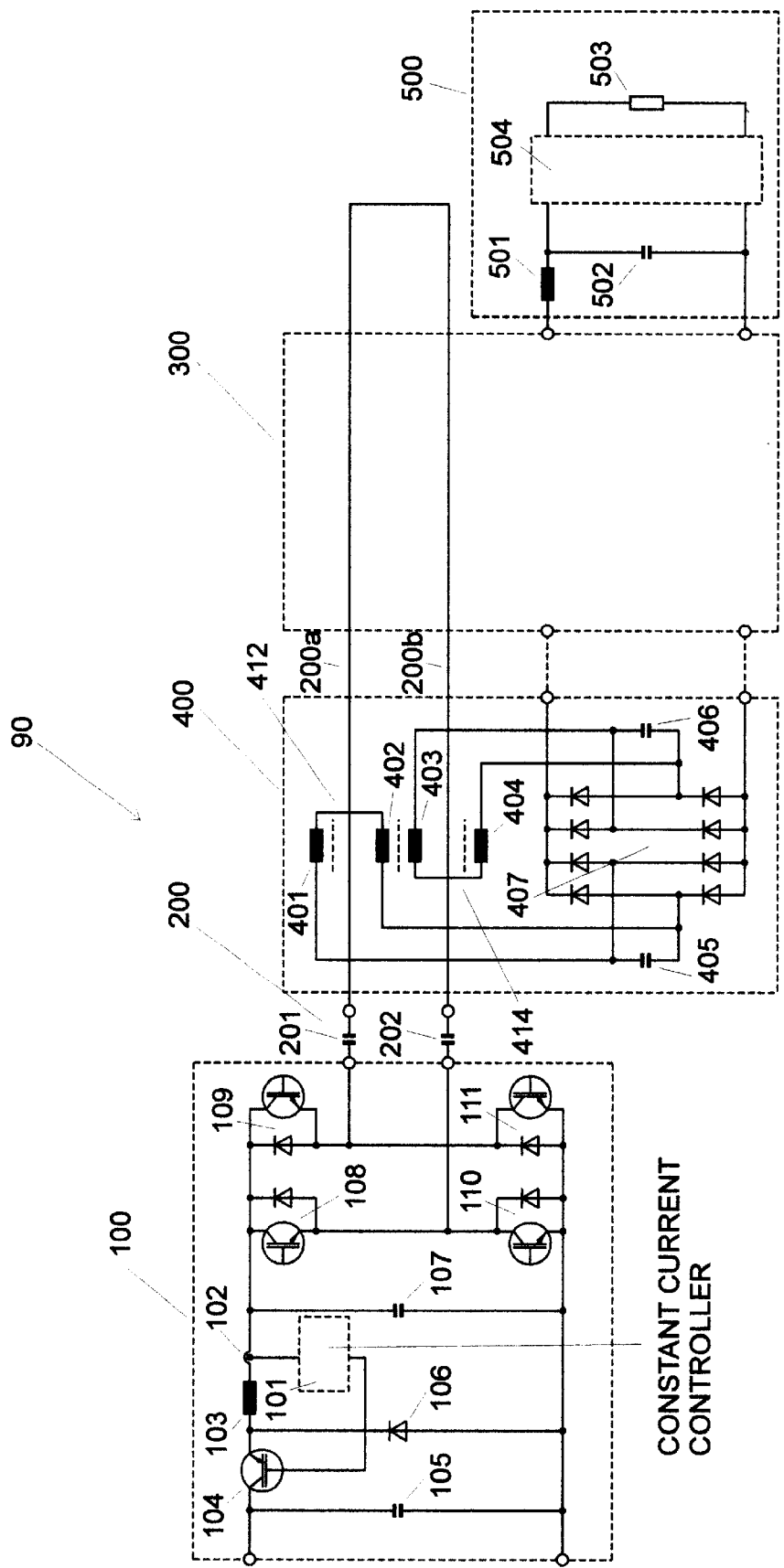
FIG. 1 is a schematic drawing of the components and subsystems of a preferred embodiment of the invention.

FIG. 20 is a schematic diagram of the general principle of contactless power transfer between a primary power source and a secondary power load. The inventive system 2000 is a contactless system which magnetically transfers electric power between a primary power source 2002 and a secondary power load 2003. The system 2000 includes a primary energy transfer network 2004 and a secondary energy transfer network 2006, which is magnetically connected to the network 2004 through magnetic coupling indicated by reference numeral 2008.

FIG. 21 is a schematic diagram of a first specific form of contactless power transfer between a primary power source and a secondary power load. FIG. 21 shows that the primary energy transfer network 2004 of the system 2000 includes a primary inductive loop 2100 and primary power factor compensation circuitry 2102. It also shows that the secondary energy transfer network 2006 includes a secondary pickup coil 2104 and secondary power factor compensation circuitry 2106. As an aspect of the invention, the primary compensation is accomplished with a capacitor 2108 in series with the primary inductive loop 2100 and the secondary main compensation is accomplished with capacitance 2110 in parallel with the main coupled inductance.

FIG. 22 is a schematic diagram of a transformer equivalent circuit for contactless power transfer using magnetically coupled primary and secondary energy transfer networks. The reference numerals identify the elements of FIGS. 20 and 21 which serve the same function.

Figure 23:
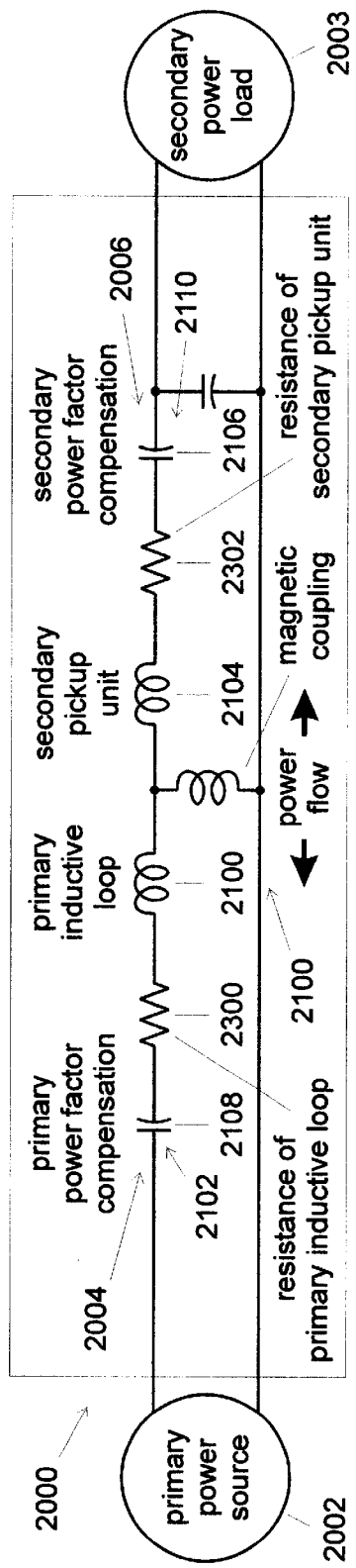
FIG. 23 is a schematic diagram of a practical transformer equivalent diagram of the contactless power transfer shown in FIG. 22.

FIG. 23 is a schematic diagram of a practical transformer equivalent diagram of the contactless power transfer shown in FIG. 22. FIG. 23 shows the resistances 2300 and 2302 which are present in both the primary inductive loop and the secondary pickup coil in any actual physical application.

Figure 4:
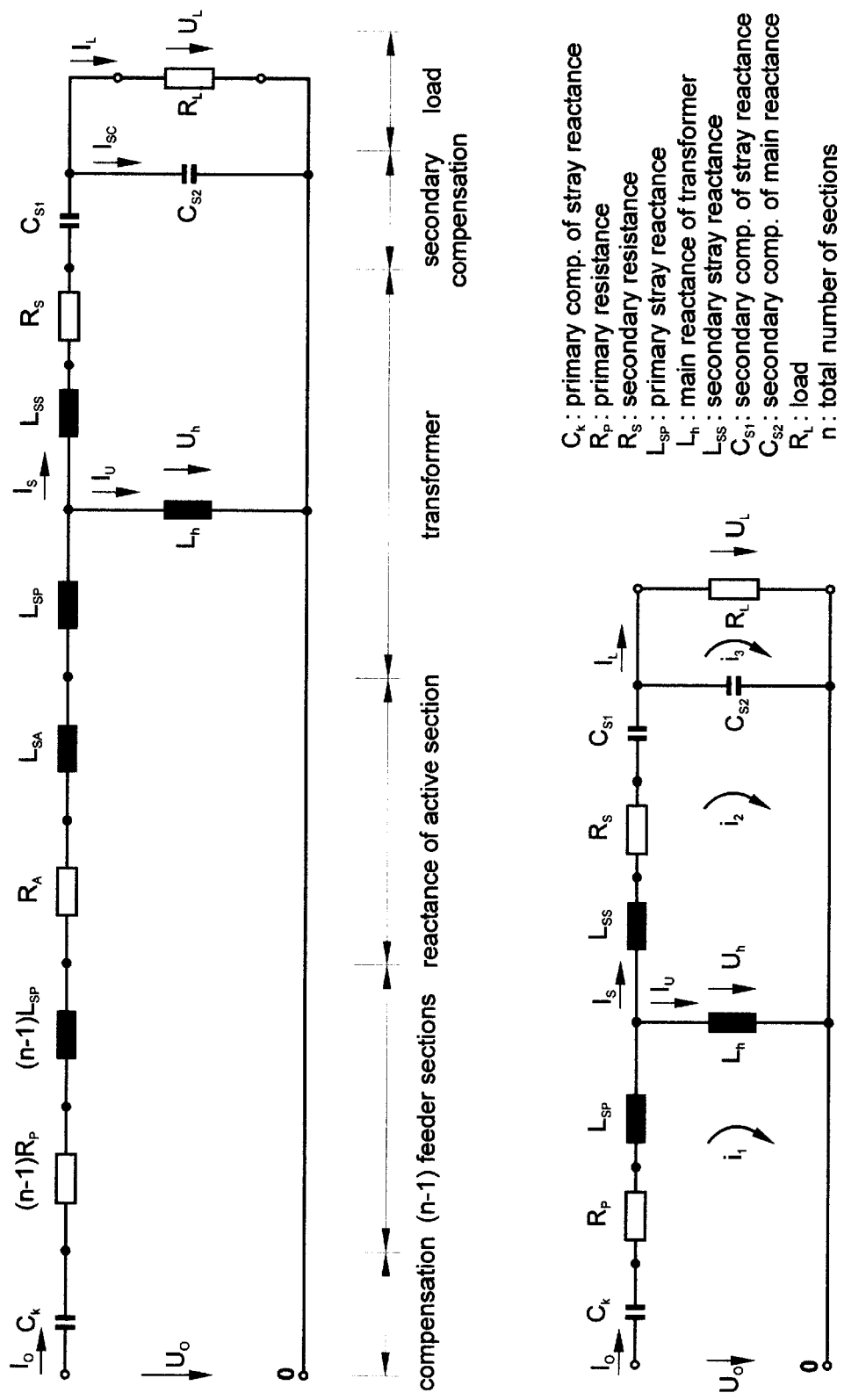
FIG. 4 is a schematic diagram of a preferred embodiment of the invention.

FIG. 4 is a schematic diagram of a preferred embodiments of a portion of the invention. As shown in the schematic diagram, $C_k$ is an external capacitor which is calculated to compensate the inductances $L_{sf}$ and $L_{SK}$ of the primary. $R_A$ is the primary resistance, which affects the primary losses. $L_h$ is the main inductance of the pick-up coil 400. $L_{SS}$ is the secondary stray inductance of the pick-up coil. This inductance is produced by the pick-up coil design and is compensated by the capacitor $C_{S1}$, which is calculated to be equal to $L_{SS}$. $R_S$ is the resistance of the pick-up coil, which leads to secondary losses. $C_{S2}$ is a capacitor which is calculated to compensate the main inductance $L_h$ (in other words, it generates the magnetizing current for the magnetic field of the pick-up coil).

Figure 24:
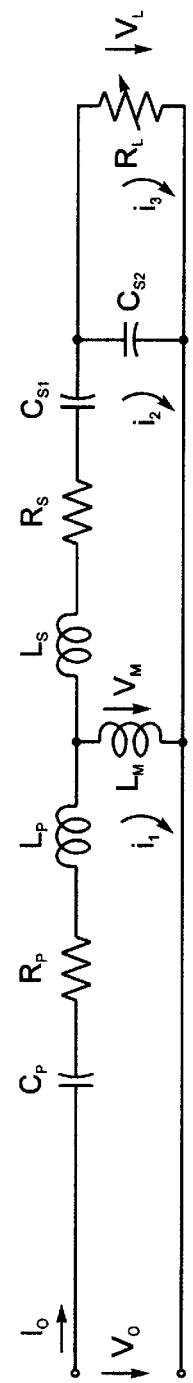
FIG. 24 is a further equivalent circuit diagram of a portion of the present invention.

FIG. 24 is a further equivalent circuit diagram of a portion of the present invention. The portion of the present invention operates with an input voltage V0 and current I0. $V_M$ is the induced voltage on the pickup coil, $V_L$ is the voltage across the load, and $i_1$, $i_2$, and $i_3$ are branch currents. $C_P$ is the primary series capacitance which compensates the inductance of the primary inductive loop $L_P$, $R_P$ is the resistance of the primary inductive loop, $C_{S1}$ is the secondary series capacitance which compensates the inductance of the secondary pickup coil $L_S$, $R_S$ is the resistance of the secondary pickup coil, $L_M$ is the main coupled induction of the primary inductive loop with the secondary pickup coil, $C_{S2}$ is the parallel capacitance which compensates $L_M$, and $R_L$ is the load resistance.

The equivalent circuit of FIG. 24, which is equivalent to the circuit of FIG. 4, reveals another aspect of the invention, which is that the primary current will rise and fall in accordance with the magnitude of the load. Under a zero load condition, the primary current falls to a near zero level, reflecting only the small resistive losses in the primary inductive loop 2100 and secondary pickup coil 2104.

Advantages of the invention are the operation at unity power factor under all load conditions, the high efficiency and ability to transfer large quantities of power, and a stable resonant frequency unaffected by load conditions.

Figure 7:
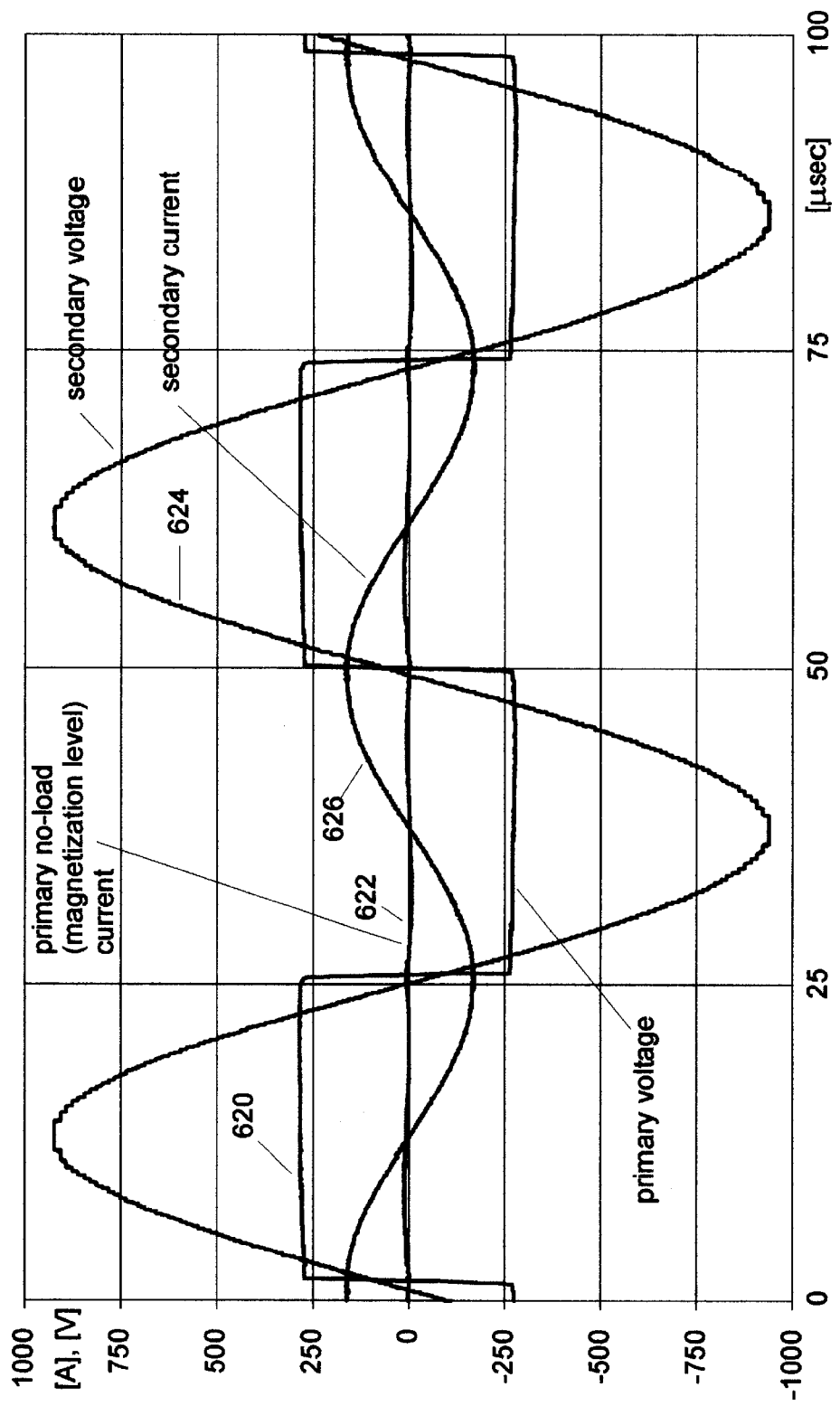
FIG. 7 is a graph of the response of an improved embodiment of the invention under a no load condition.

FIG. 7 is a graph of the response of an improved embodiment of the invention under a no load condition. The primary voltage and current are in phase. The primary voltage waveform 620 is substantially rectangular, although it could be sinusoidal if desired. The primary current waveform 622 has some of the same harmonics as the primary voltage waveform 620. Both the secondary voltage and current waveforms 624 and 626 are substantially sinusoidal.

Figure 8:
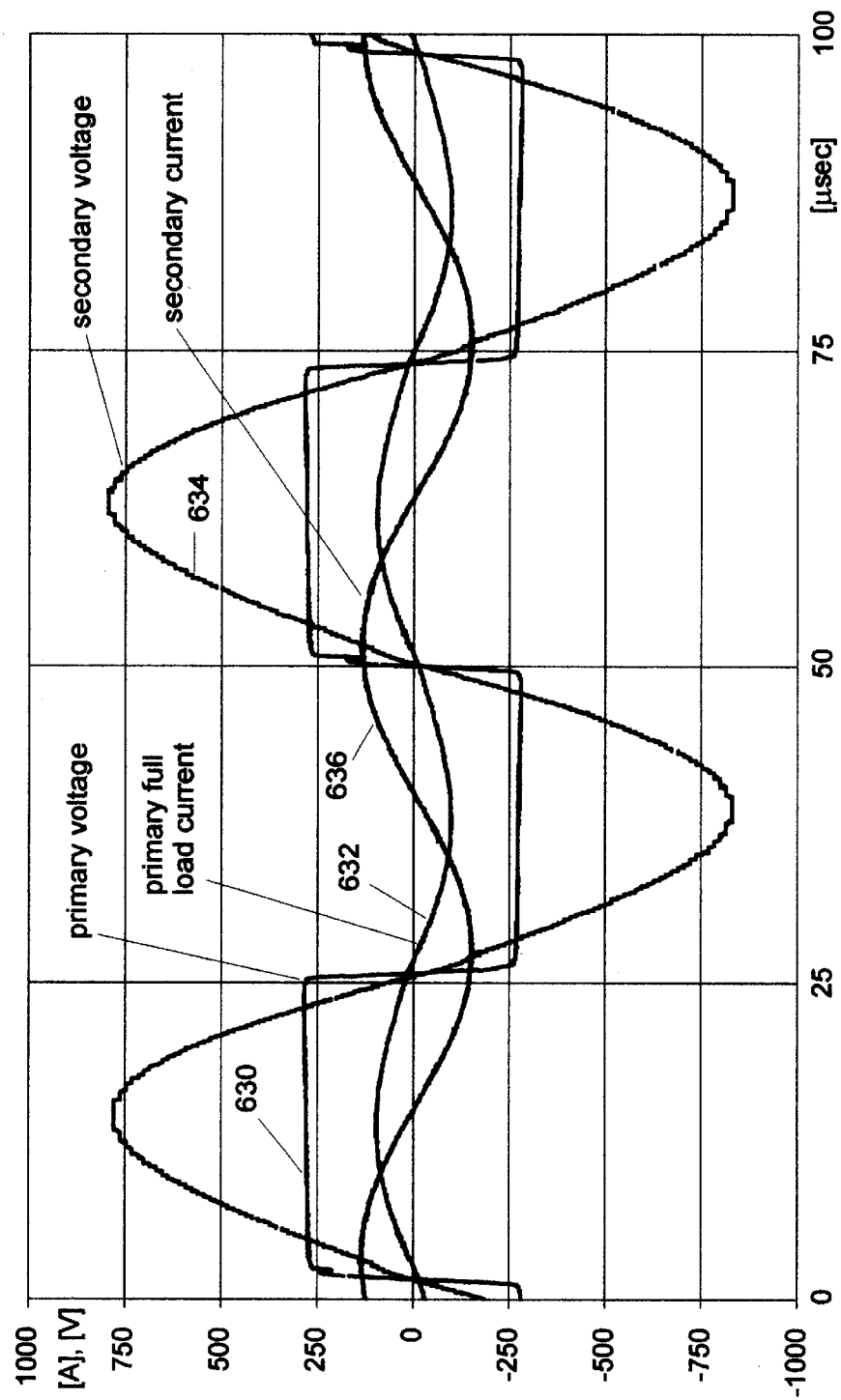
FIG. 8 is a graph of the response of an improved embodiment of the invention under a loaded condition.

FIG. 8 is a graph of the response of an improved embodiment of the invention under a loaded condition. The primary voltage and current are in phase. The primary voltage waveform 630 is substantially rectangular, although it could be sinusoidal if desired. The primary current waveform 632 has some of the same harmonics as the primary voltage waveform 630. Both the secondary voltage and current waveforms 634 and 636 are substantially sinusoidal.

Figure 5:
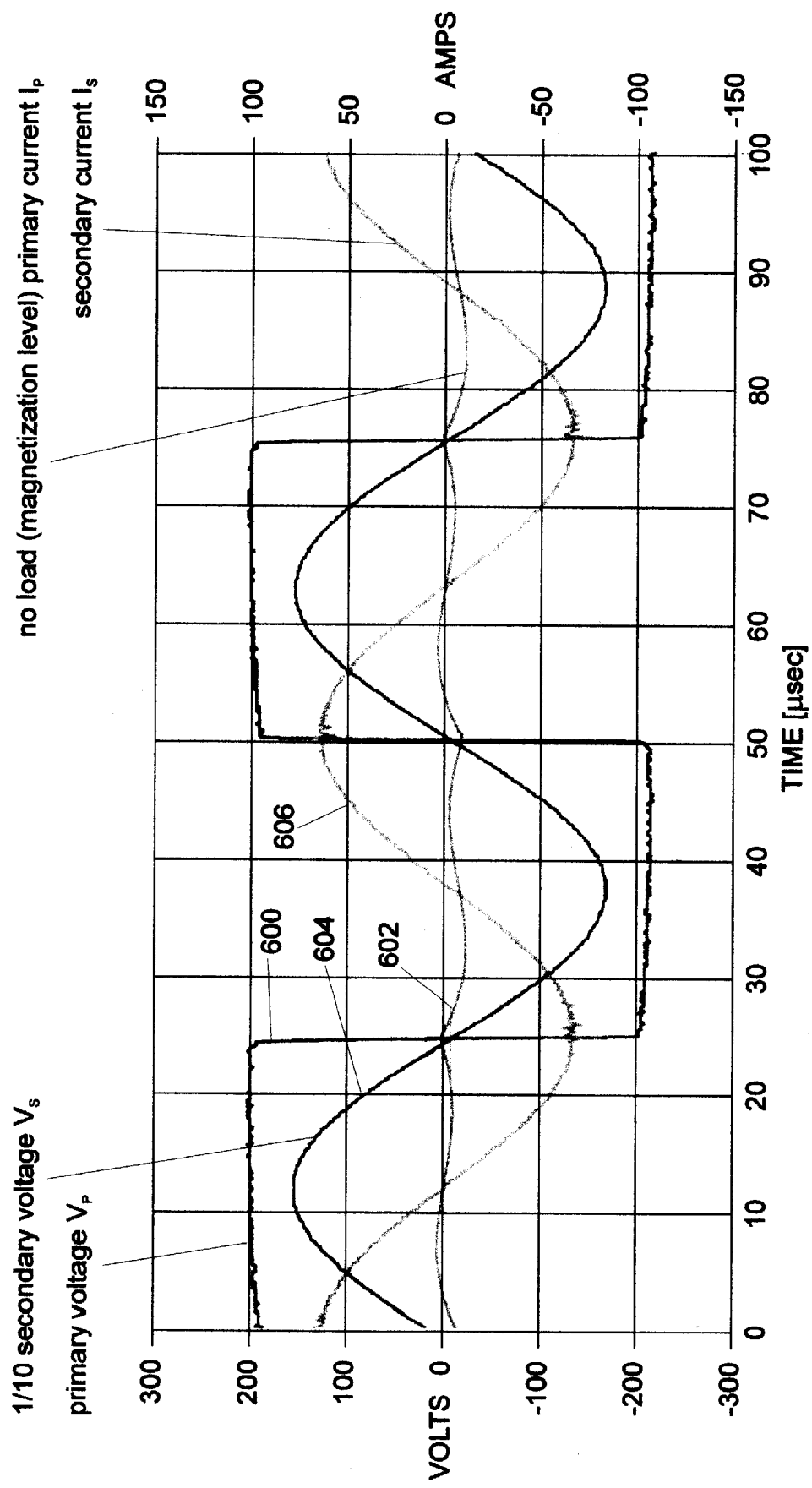
FIG. 5 is a graph of the response of a preferred embodiment of the invention under a no load condition.

FIG. 5 is a graph of the response of a preferred embodiment of the invention under a no load condition. The primary voltage and current are in phase. It shows the primary voltage waveform 600, the primary current waveform 602, the secondary voltage waveform 604, and the secondary current waveform 606. The primary voltage waveform 600 is substantially a 20 kHz square wave which switches between a positive voltage of 200 volts and a negative voltage of −200 volts. However, the primary voltage waveform 600 could be a sinusoid if a properly-designed inverter is used. The primary current waveform 602 is quite low relative to the secondary current (being less than about 10 A), but in phase with the primary voltage waveform 600. The secondary voltage waveform 604 is substantially sinusoidal and in phase with the primary voltage waveform 600. The secondary current waveform 606 has a 180 degree phase shift relative to the primary current waveform 602 and is equal to the magnetizing current of the pick-up coil 400. The secondary current waveform 606 also has minor transients (switching commutations) at the time when the primary voltage waveform 600 switches.

Figure 6:
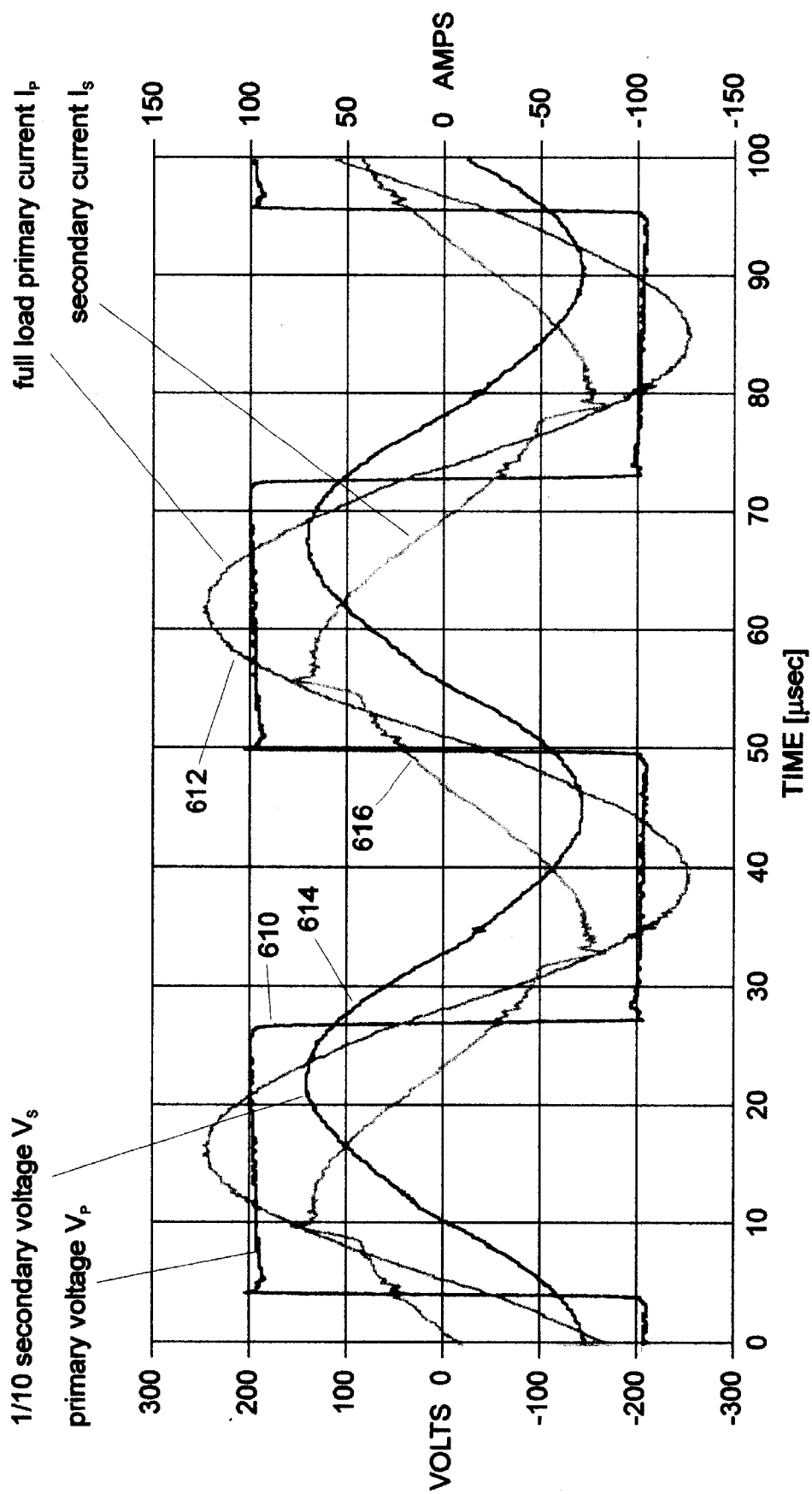
FIG. 6 is a graph of the response of a preferred embodiment of the invention under a loaded condition.

FIG. 6 is a graph of the response of a preferred embodiment of the invention under a loaded condition. The primary voltage and current are in phase. It shows the primary voltage waveform 610, the primary current waveform 612, the secondary voltage waveform 614, and the secondary current waveform 616. The primary voltage waveform 610, like primary voltage waveform 600, is substantially a square wave, although it could also be a sinusoid if a properly-designed inverter is used. The primary current waveform 612 is in phase with the primary voltage and has a value equal to the load conditions, so that the power factor is one. The secondary voltage waveform 614 is substantially sinusoidal. The secondary current waveform 616 has minor transients both at and after the time when the primary voltage waveform 600 switches.

Figure 25:
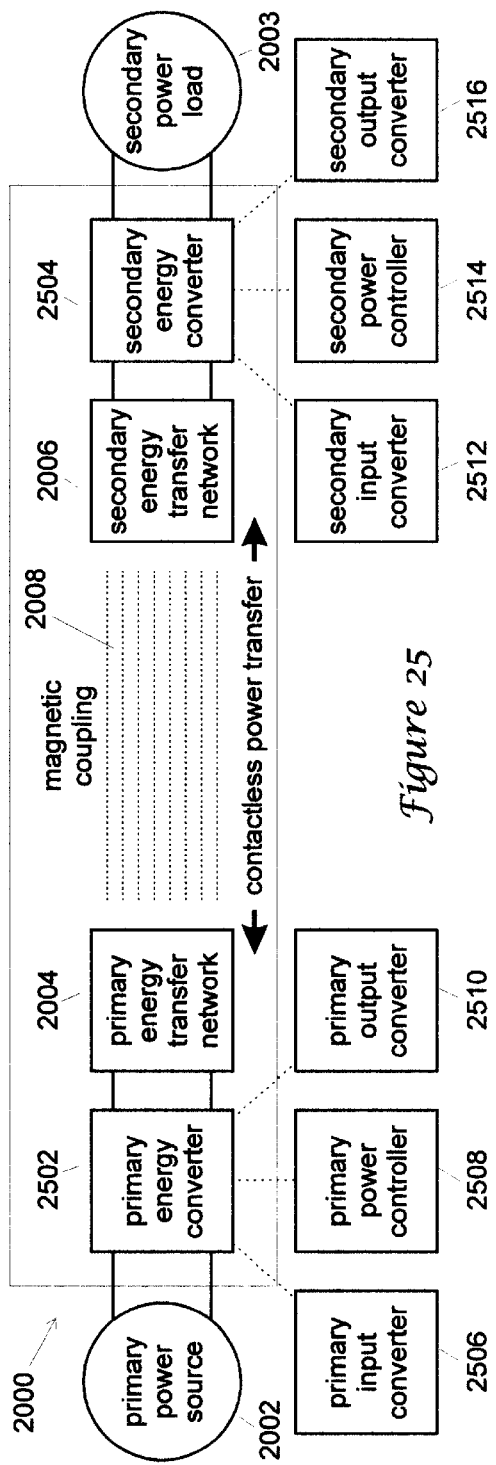
FIG. 25 is a schematic diagram of an aspect of the present invention, including primary and secondary energy converters.

FIG. 25 is a schematic diagram of an aspect of the present invention, including primary and secondary energy converters. The system 2000 shown in FIG. 25 includes a primary energy converter 2502 and a secondary energy converter 2504. The energy converters 2502 and 2504 make possible the universal application of the present invention to systems which have AC sources and loads, active and passive loads, and single and multiple loads.

The primary energy converter includes a primary input inverter 2506, a primary power controller 2508, and a primary output inverter 2510. The primary input inverter 2506 is required only for AC sources, converting from AC to DC for forward power flow and from DC to AC for reverse power flow. the primary power controller 2508 supplies DC power to the primary output inverter 2510 as a constant voltage for single loads or as a constant current for multiple loads. The primary output inverter 2510 converts the DC power to a single phase AC output at a selected operating frequency up to 30 kHz.

The secondary energy converter 2504 includes a secondary input inverter 2512, a secondary power controller 2514, and a secondary output inverter 2516. The secondary input inverter 2512 converts the high frequency voltage which is induced in the pickup coil to DC. The secondary power controller 2514 supplies DC power at a constant voltage to the secondary output inverter 2516 for single loads, and also controls the flow of reverse power through the secondary input inverter 2512. The secondary output inverter 2516 is required only for AC loads, converting from DC to AC for forward power flow and from AC to DC for reverse power flow.

Figure 26:
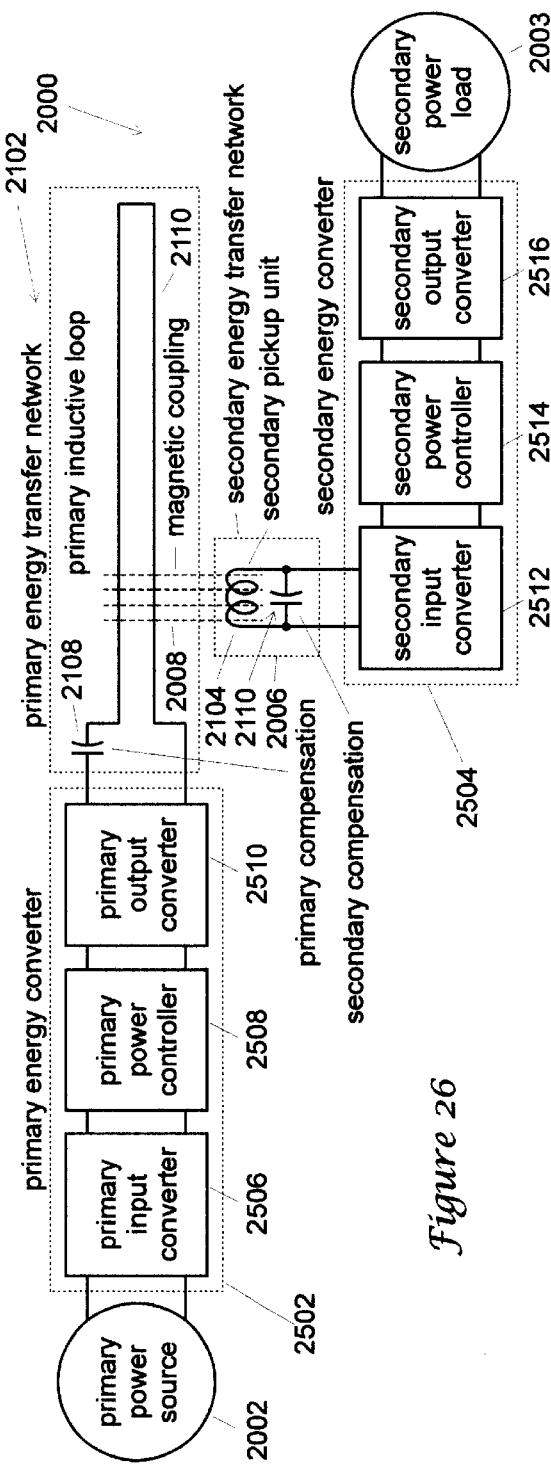
FIG. 26 is a block diagram of the present invention.

FIG. 26 is a block diagram of the present invention.

FIGS. 3A–C are comparisons between the inventive CPS system and a prior art system. The inventive CPS system is a contactless power supply (CPS) system that is described in the foregoing and following. The prior art system is known as the IPT system. As shown on the sheet carrying FIGS. 3A–C, some of the main characteristics of the inventive CPS system are that the secondary portion of the inventive CPS system is equivalent to a series resonant circuit including series secondary capacitive, inductive and resistive elements in series with a variable load. As shown in the upper left of the sheet carrying FIGS. 3A–C, and as will be understood by those skilled in the art, in the inventive CPS system the impedances of the secondary capacitive and inductive elements cancel one another out at the ringing frequency, regardless of whether there is any load or the maximum rated load. The current through the system is constant (at 86.4 A for the particular system studied). There is no requirement for the ratio of the impedance of the secondary impedance to the load resistance. The phase angle between the voltage across the series combination and the current through the series combination is independent of the load. Finally, the power transferred to the secondary(ies) is limited to the design of the power block.

Figure 3:
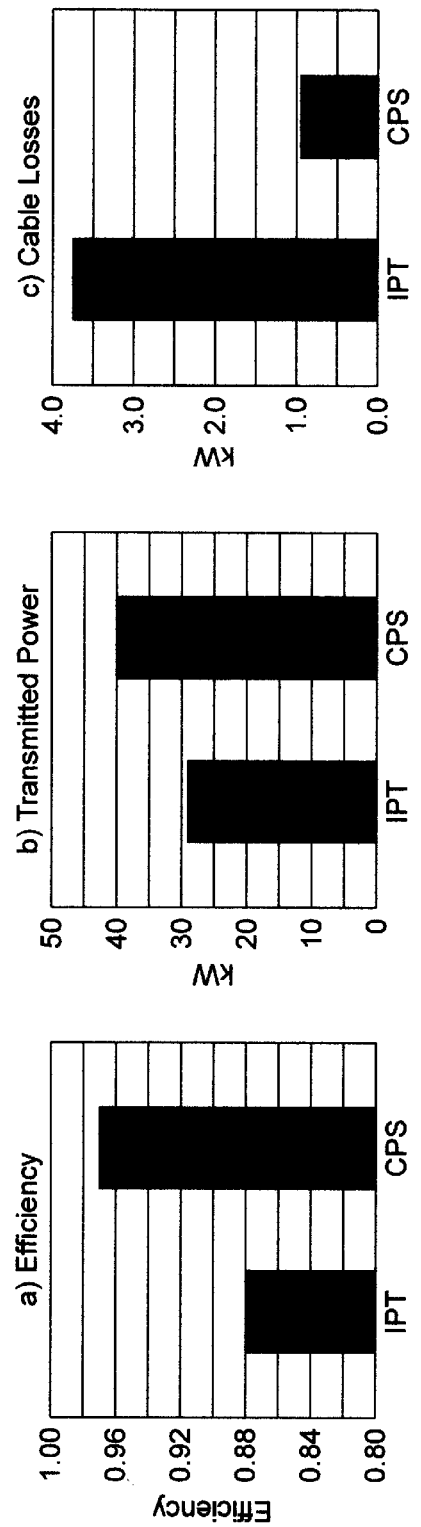
FIGS. 3A–C are comparisons between the inventive CPS system and a prior art system.

In the comparison provided by FIG. 3, the secondary load has been referred to the primary and equivalent circuits with corresponding vector diagrams for no load and maximum load conditions.

The primary energy converter of the inventive design supplies a constant current and consequently power can be transferred to multiple loads of varying magnitude without one load affecting the others. Using the compensation method previously described, the system operates at unity power factor under all load conditions and thus the efficiency is quite high. Also, the resonant frequency of the system is stable and unaffected by varying load conditions.

By way of contrast, the IPT system is a parallel resonant circuit operating under constant voltage conditions. The impedance of the secondary is at least 3 times the load resistance. The pick-up of the IPT system is decoupled by the reactance of the secondary system. The phase angle between the (constant) voltage and the current through the IPT system depends upon the load. Finally, the power transferred to the secondary is limited by the fact that the system voltage is limited and by the length of the zone in which the secondary operates. In summary, as shown in FIG. 3A, the present inventive CPS system is approximately 97 percent efficient, whereas the IPT system is approximately 88 percent efficient. As shown in FIG. 3B, the power transmitted by the present inventive CPS system (under predetermined conditions) is about 40 kW, whereas the power transmitted by the IPT system (under the same predetermined conditions) is 28 kW. Also, as shown in FIG. 3C, the cable losses of the present inventive CPS system (under predetermined conditions) is about 900 W. whereas the cable losses of the IPT system are greater than about 3.7 kW.

In contrast with the present invention, the prior art uses parallel capacitance to compensate the primary inductive loop which results in a very high circulating current that is nearly independent of the magnitude of the load. This high level of reactive power is described as necessary in order to partially, but not completely, offset the consequences of varying load magnitude, but forces the system to always operate at less than unity power factor and thus increases the losses and reduces the power transfer. Additionally, the prior art describes the necessity to decouple the secondaries in order to partially, but not completely, overcome the power limiting effect of one lightly loaded secondary on other secondaries. Finally, the prior art describes how varying loads shift the resonant frequency and thus make necessary some form of tuning adjustment.

Figure 9B:
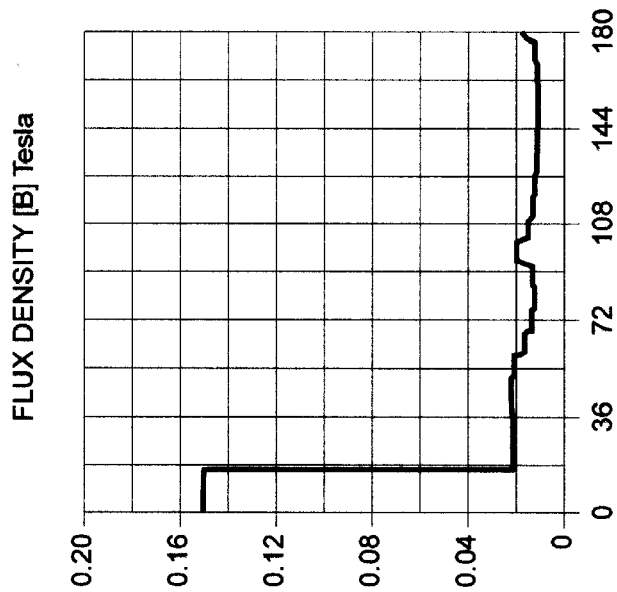
FIG. 9B is a graph of the flux density around the pole piece of the preferred embodiment of the inventive CPS system, where the inventive CPS system is under a first test condition.
Figure 9A:
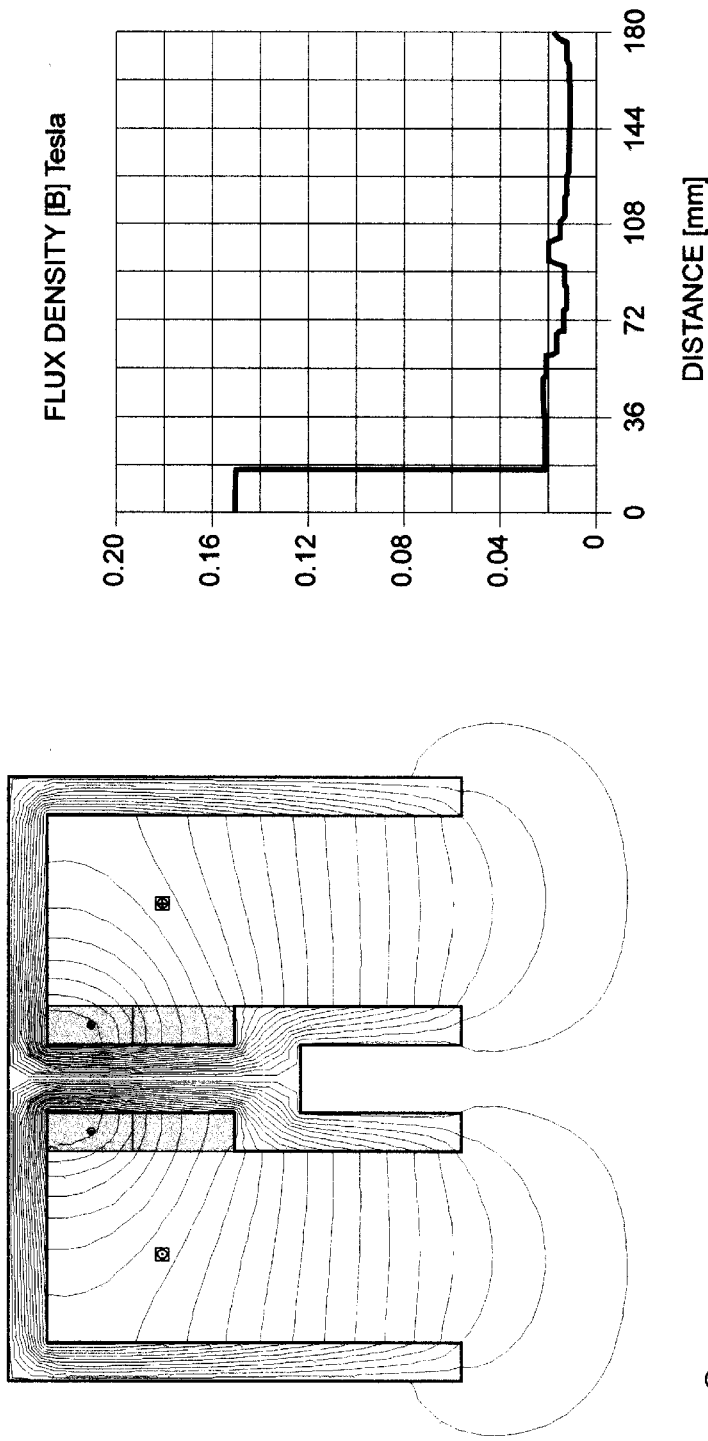
FIG. 9A is a diagram showing the flux lines around the pole piece of the preferred embodiment of the inventive CPS system, where the inventive CPS system is under a first test condition.

FIG. 9A is a diagram showing the flux lines around the secondary core form of the preferred embodiment of the inventive CPS system, where the inventive CPS system is under a first test condition. The secondary core form has the middle yoke 421, and the two side yokes 422 and 423. The core form is made from conventional core iron and has a stray flux of about 48 percent (that is, the ratio of the secondary flux to the primary flux is 1.48). FIG. 9B is a graph of the flux density around the secondary core form of the preferred embodiment of the inventive CPS system, where the inventive CPS system is under the first test condition.

Figures 10A, 10B:
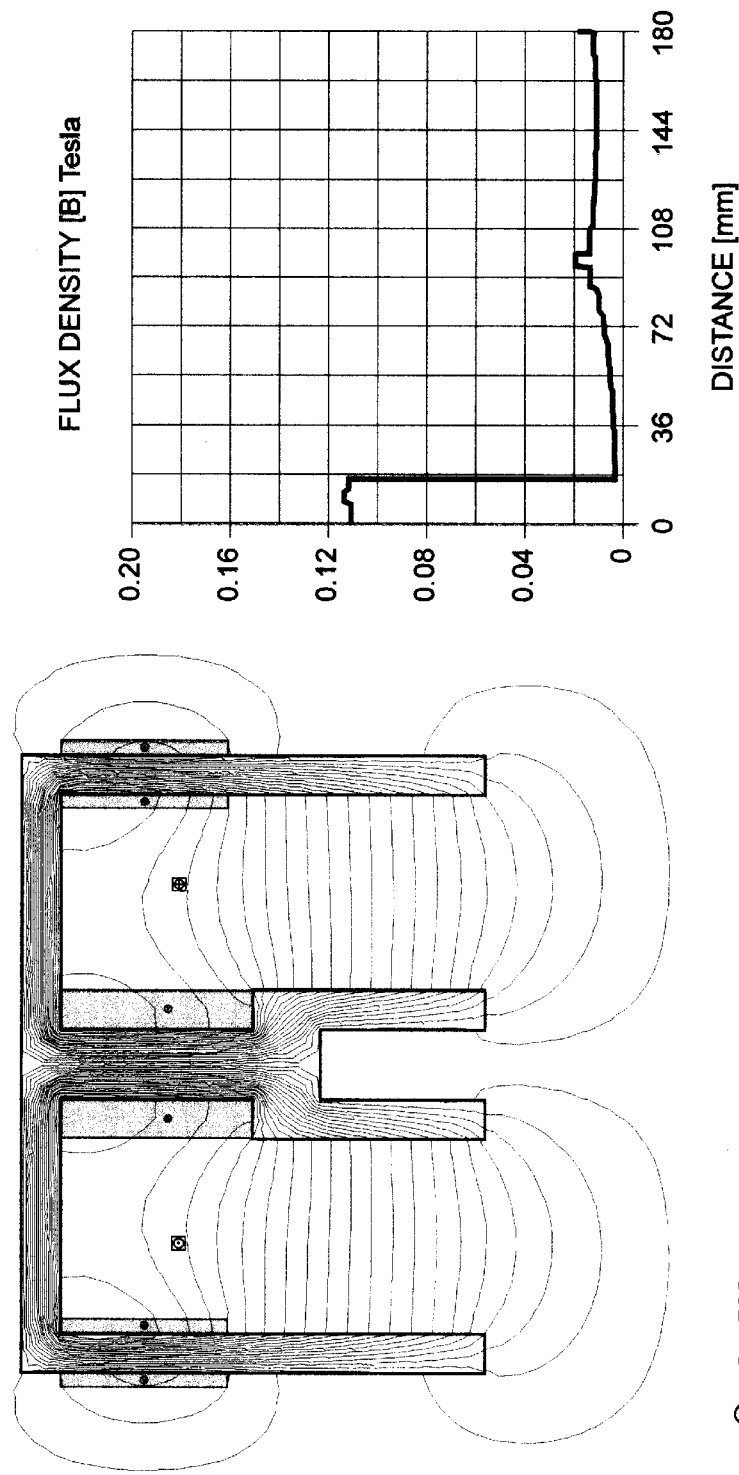
FIG. 10A is a diagram showing the flux lines around the pole piece of the preferred embodiment of the inventive CPS system, where the inventive CPS system is under a second test condition.
FIG. 10B is a graph of the flux density around the pole piece of the preferred embodiment of the inventive CPS system, where the inventive CPS system is under a second test condition.

FIG. 10A is a diagram showing the flux lines around the previously-discussed pole piece of the preferred embodiment of the inventive CPS system, where the inventive CPS system is under a second test condition. The secondary core form has the middle yoke 421, and the two side yokes 422 and 423. The core form is made from a new core iron and has a stray flux of only about 8 percent (that is, the ratio of the secondary flux to the primary flux is 1.08). FIG. 10B is a graph of the flux density around the pole piece of the preferred embodiment of the inventive CPS system, where the inventive CPS system is under a second test condition.

Figure 16A:
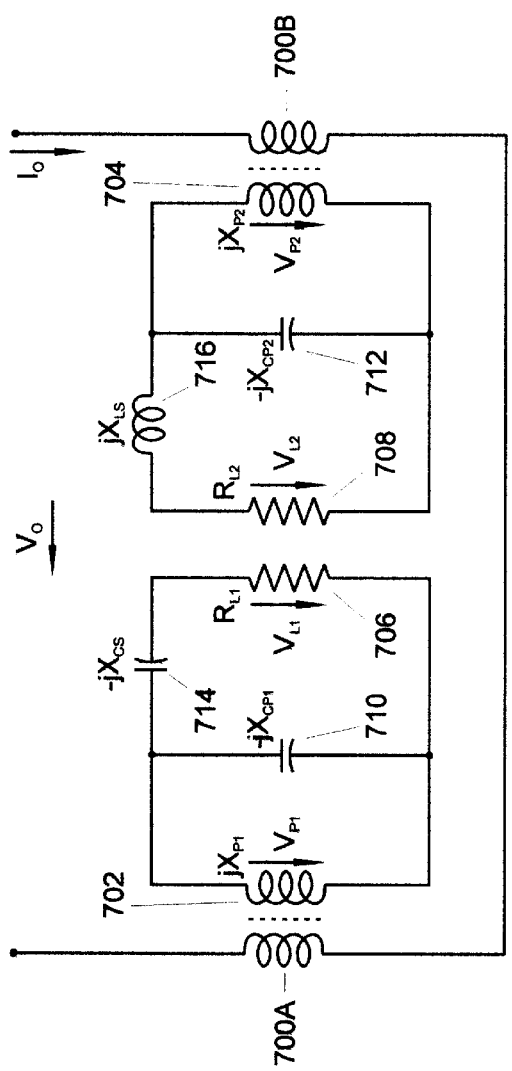
FIG. 16A is a schematic diagram explaining the operation of an aspect of the present invention.
Figure 16B:
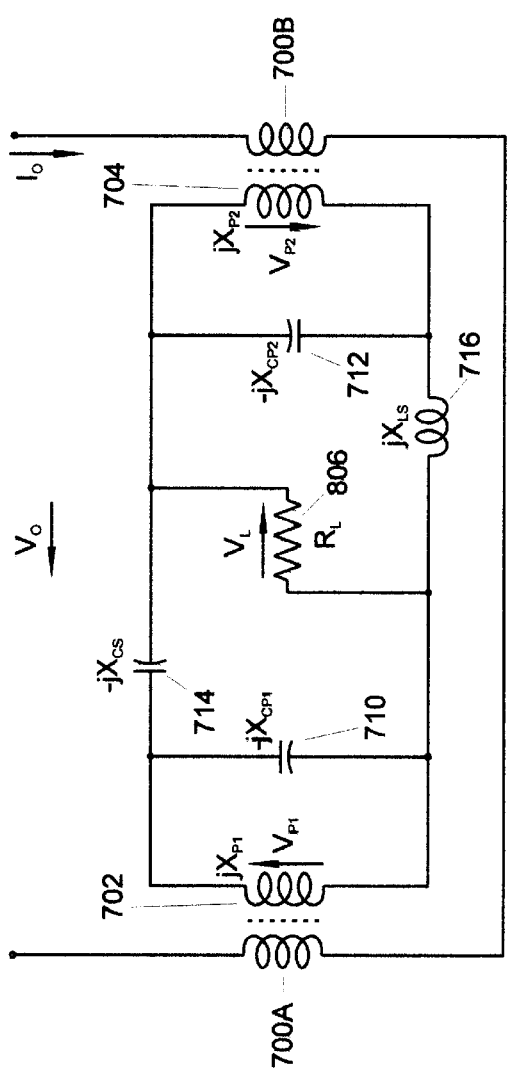
FIG. 16B is a schematic diagram explaining the operation of a practical implementation of the present invention.

FIG. 16A is a schematic diagram explaining the operation of an aspect of the present invention, and FIG. 16B is a schematic diagram explaining the operation of a practical implementation of the present invention. In both figures, the coils 700A and 700B represent two halves of the distributed inductance of the primary 200 (see FIG. 1 and its discussion). The coil 702 is one of the two windings of a pick-up coil (such as first pick-up 300 and second pick-up 400). The coil 704 is the other of the two windings of a pick-up coil (such as first pick-up 300 and second pick-up 400). The coil 702 is coupled to the coil 700A, and the coil 704 is coupled to the coil 700B. The coil 700A has an inductive impedance of $jX_{P1}$ and the coil 700B has an inductive impedance of $jX_{P2}$. The ringing frequency of the coil 702 is established by the capacitor 710, which has a capacitive impedance of $-jXC_{P1}$ and the ringing frequency of the coil 704 is established by the capacitor 712, which has a capacitive impedance of $-jXC_{P2}$. In FIG. 16A, the load is represented by the two resistances 706 and 708. In FIG. 16B, the load is represented by the resistance 806.

In operation, the circuit represented by the FIGS. 16A and 16B is activated by an AC voltage $V_0$, which induces a current $I_0$. Passage of the current $I_0$ through the coils 700A and 700B generates the respective voltages VP1 and VP2, which, through the operation of the circuit of FIGS. 16A and 16B, cause the respective voltages $V_{L1}$ and $V_{L2}$ to be generated in the resistances 706 and 708. The capacitor 714 and the inductor 716 are selected so that their impedances (respectively, $-jX_{CS}$ and $jX_{LS}$) cancel each other out at the ringing frequency.

Figure 27:
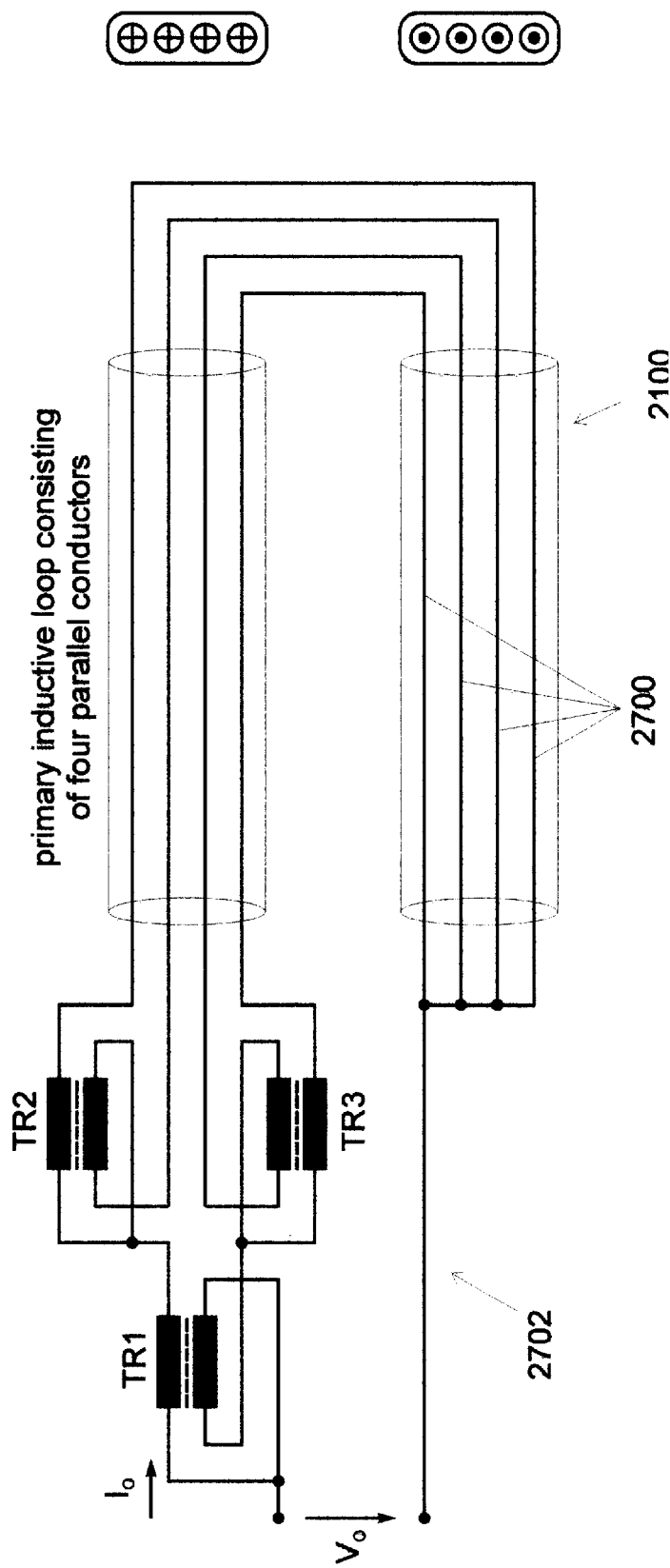
FIG. 27 is a schematic diagram of the primary inductive loop of the present invention.

FIG. 27 is a schematic diagram of the primary inductive loop of the present invention. The primary inductive loop 2100 includes multiple conductors 2700 connected in parallel. To increase ampere-turns, the primary inductive loop 2100 can be configured with multiple turns. The disadvantage is that the primary output inverter voltage increases with each turn, and this voltage is limited by component rating. By connecting multiple conductors in parallel the ampere-turns of the primary inductive loop 2100 is increased without increasing the inverter voltage. The individual conductors 2700 are connected via current balancing transformers 2702, as will be understood by those skilled in the relevant arts. Each of the transformers 2702 compares two currents and adds a voltage to the conductor 2700 with the lower current and subtracts a voltage from the conductor 2700 with the higher current thereby equalizing the currents in the conductors 2700. This minimizes losses and increases efficiency.

Figure 28:
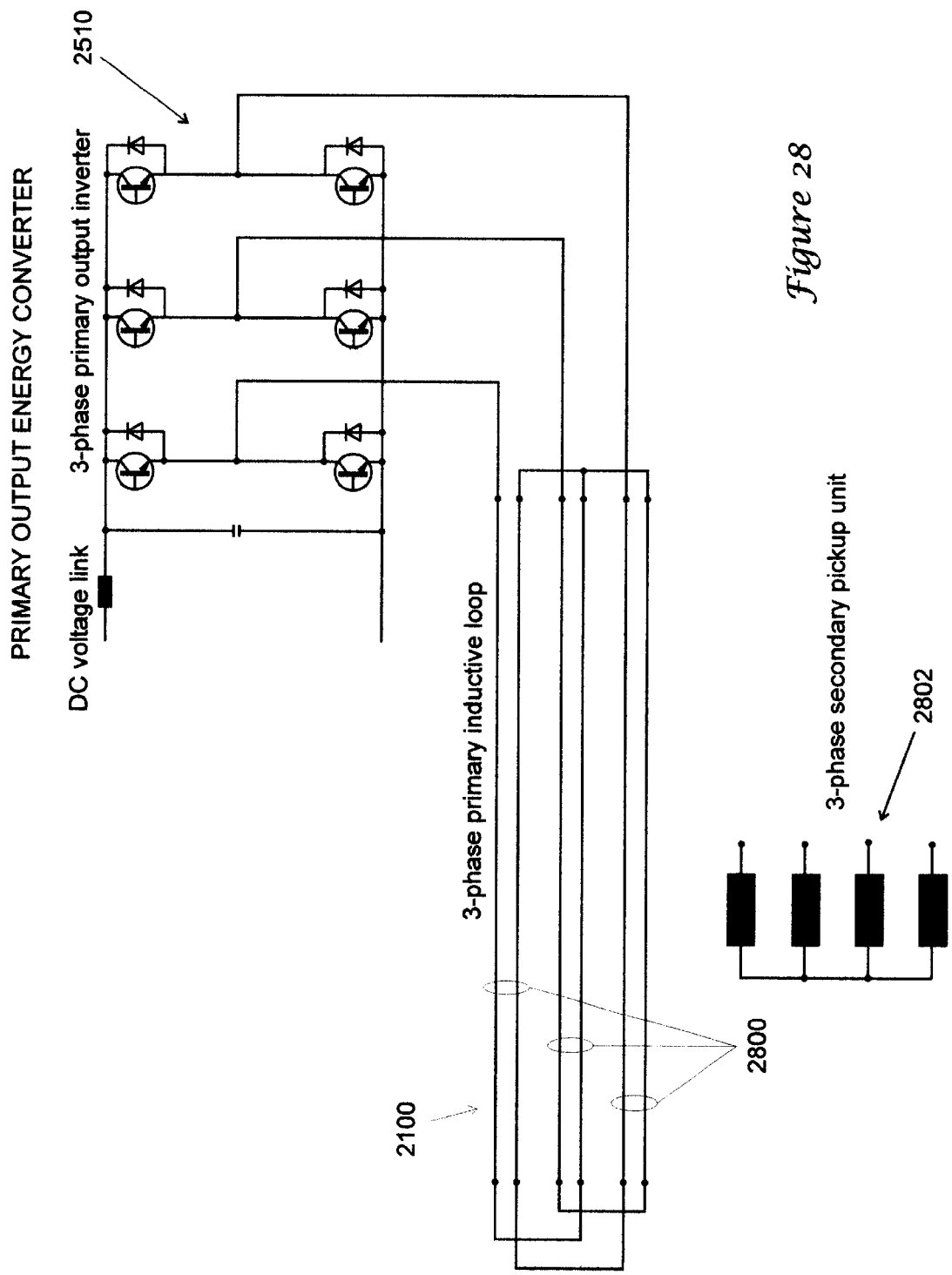
FIG. 28 is a schematic diagram of an embodiment of the present invention wherein the primary and secondary energy transfer networks are three-phase systems.

FIG. 28 is a schematic diagram of an embodiment of the present invention wherein the primary and secondary energy transfer networks are three-phase systems. The primary output inverter 2510 is designed as a three-phase inverter and the primary inductive loop 2100 includes three parallel conductors 2800 instead of two. The pickup coil 2802 has a four-yoke ferromagnetic core and distributed windings which are magnetically coupled to the primary inductive loop 2100. This allows greater power transfer.

Figure 29:
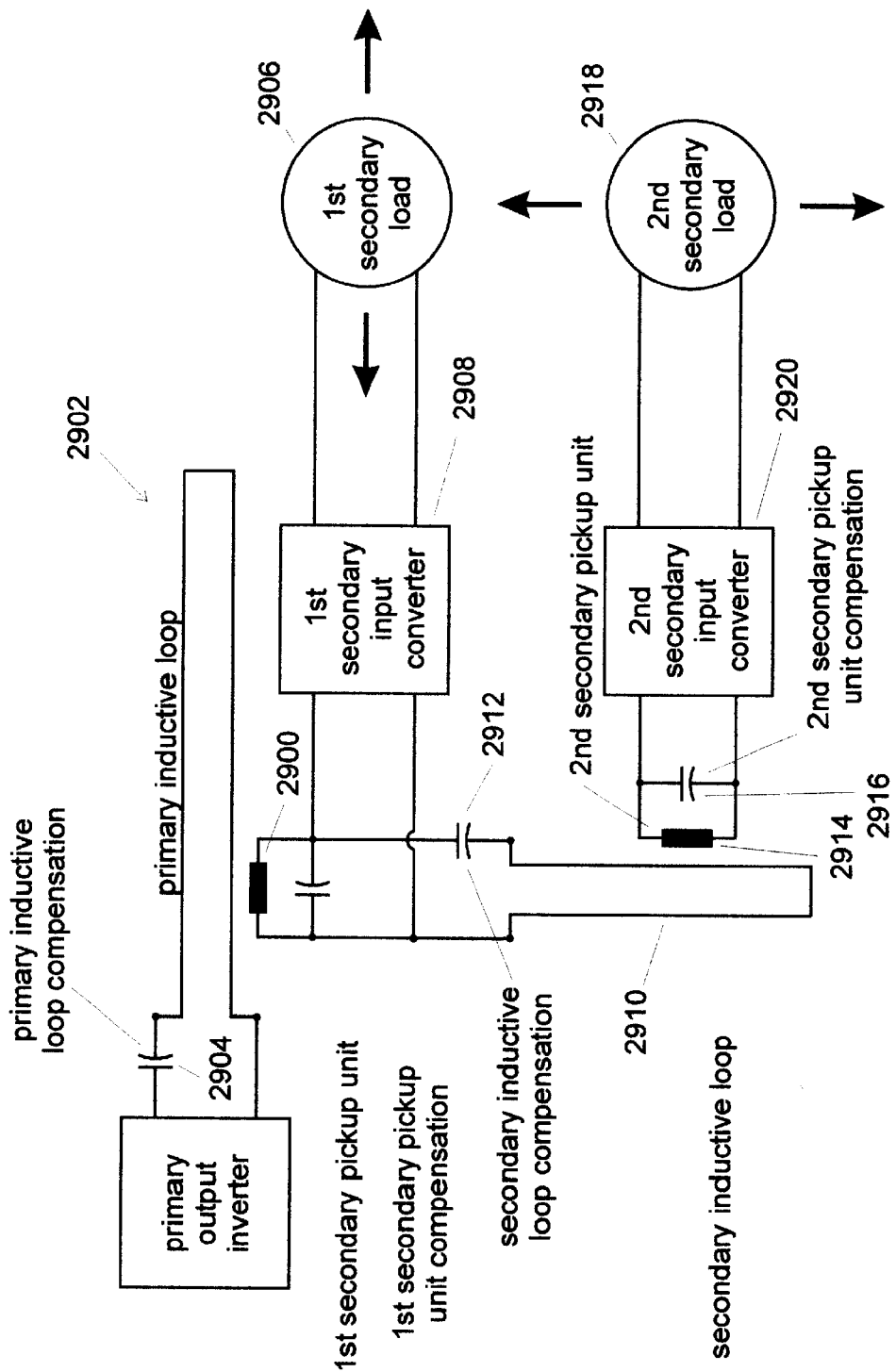
FIG. 29 is a schematic diagram of an embodiment of the present invention showing a first pickup coil magnetically coupled to a primary inductive loop.

FIG. 29 is a schematic diagram of an embodiment of the present invention showing a first pickup coil 2900 magnetically coupled to a primary inductive loop 2902. The primary inductive loop 2902 is compensated to unity power factor with a series capacitor 2904. The first pickup coil 2900 is connected to a first load 2906 via a first input inverter 2908. The first pickup coil 2900 is also connected to a secondary inductive loop 2910 which is compensated to unity power factor with series capacitance 2912. A second pickup coil 2914 is magnetically coupled to the secondary inductive loop 2910, compensated to unity power factor with parallel capacitance 2916, and connected to a second load 2918 via a second input inverter 2920. More than one pickup coil can be magnetically coupled to the primary inductive loop 2902 or the secondary inductive loop 2910, and more than one secondary input inverter 2920 can be connected to each pickup coil 2914. This allows power to be transferred from a primary to one or more multiple-load secondaries in which the loads are operating on different motion axes.

One example of such an application is an overhead crane where the bridge is traveling longitudinally, the trolley is traveling laterally, and the hoist is traveling vertically. More than one crane can be traveling on the runway. This aspect of the invention enables noncontact power to be transferred to all of the crane drives from a single primary.

FIGS. 12A–E are schematic diagrams of a preferred embodiment of the invention having a multiple-zone primary configuration. As shown, each zone is either active (see FIG. 12B) or passive (see FIG. 12C), depending upon the position of the switch(es) 650, as shown by the arrows indicating current through the various lines.

When a zone is inactive, it is magnetically neutral and cannot transmit power to the secondary. This allows zone control for anti-collision of multiple vehicles. Since each zone is restricted to one load, all loads are connected in parallel and see the same voltage. Parallel connection of loads eliminates the phenomenon of impedance reflection by the multiple series loads. By properly switching the zones, there is a switching configuration which allows the inverters to feed multiple power zones in order to load-share an adjoining zone in the event of an inverter failure.

Figures 12D, 12E:
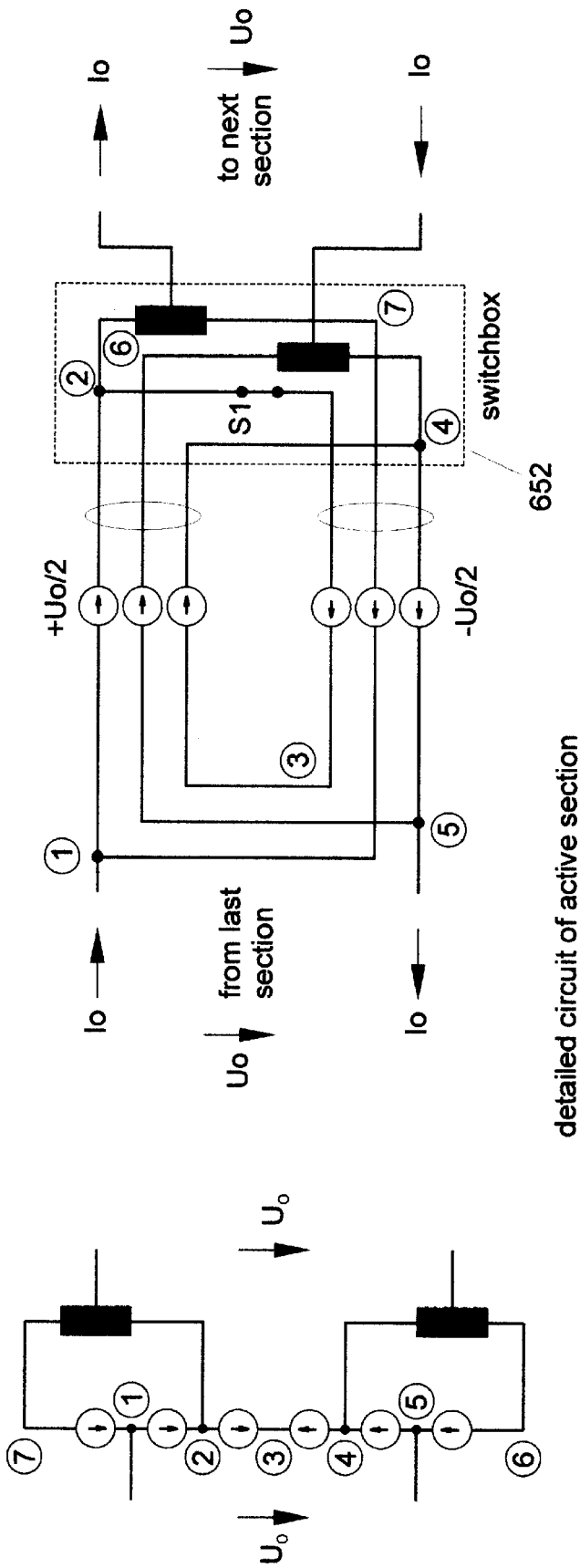

FIG. 12D is the equivalent circuit of the circuit shown in FIG. 12B, and FIG. 12E is the equivalent circuit of the circuit shown in FIG. 12C.

The principle of primary constant current control involves a high frequency AC-current $I_{prim}$ at the inverter output which flows through the primary. The AC-current $I_{prim}$ is formed into a ripple containing input DC-current $I_0$ at the inverter input. The ripple containing input DC-current $I_0$ is formed into a smooth and ripple-free DC-current $I_4$ of identical value by a small smoothing capacitor which gives the variable DC-voltage $U_{41}$. The DC current $I_4$ is measured by a current probe and fed to a current controller. This current controller gives a signal to the transistor on the primary (buck-converter) which varies the always constant DC-voltage $U_{40}$ into a total secondary load dependent variable DC-voltage $U_{41}$ so that the amplitude of the primary AC-current $I_{prin}$ stays constant. Because of the smoothing capacitor and smoothing inductance on the secondary the DC-chopper (boost-converter) acts as a "buffer" with regard to power variation on the secondary. Accordingly, only weak power variations (at a frequency of less than 10 Hz) have to be controlled by the primary current controller. So, the high frequency components (30 kHz) of $I_0$ can easily be separated by the smoothing capacitor $U_{41}$.

In summary, the secondaries can be decoupled by feeding the primary with constant current instead of constant voltage. Because of the electrical series connection of the secondaries (as seen from the primary side) the primary current will not change even if the individual loads on the secondary change because the primary current is controlled by a primary current controller. Also, a boost converter (described in connection with FIG. 1) on each secondary converts the constant primary current (which is transformed on each secondary side by the pick-up coil) into a constant output voltage on the secondary output.

As shown in FIGS. 12D and 12E, the constant voltage U0 is fed to the left input side of the active section. This voltage will be transmitted to the right side of the section in order to supply the next (not shown) section with the power U0 I0. The input current on the left input side is equal to the output current (I0) plus the section current (I1), which is the equivalent of the vehicle power inside the active section. The output spare transformers are small because of the applied high frequency. Inside the switch box 652 are constant compensation capacitors (not shown), spare transformers (up to 20 kW), and a mechanical or semiconductor switch. The advantages of this configuration are that: no tuning device depending on variable loads is required, there is a constant voltage for all sections, there are simple power and control units for ground and vehicle power supplies, and there is no coupling between different vehicles depending on variable loads. In contrast, in the prior art for multiple secondary loads, the pick-up coil must be decoupled in order to minimize the effect of one or more lightly loaded pickup coils.

Figures 13A, 13B, 13C:
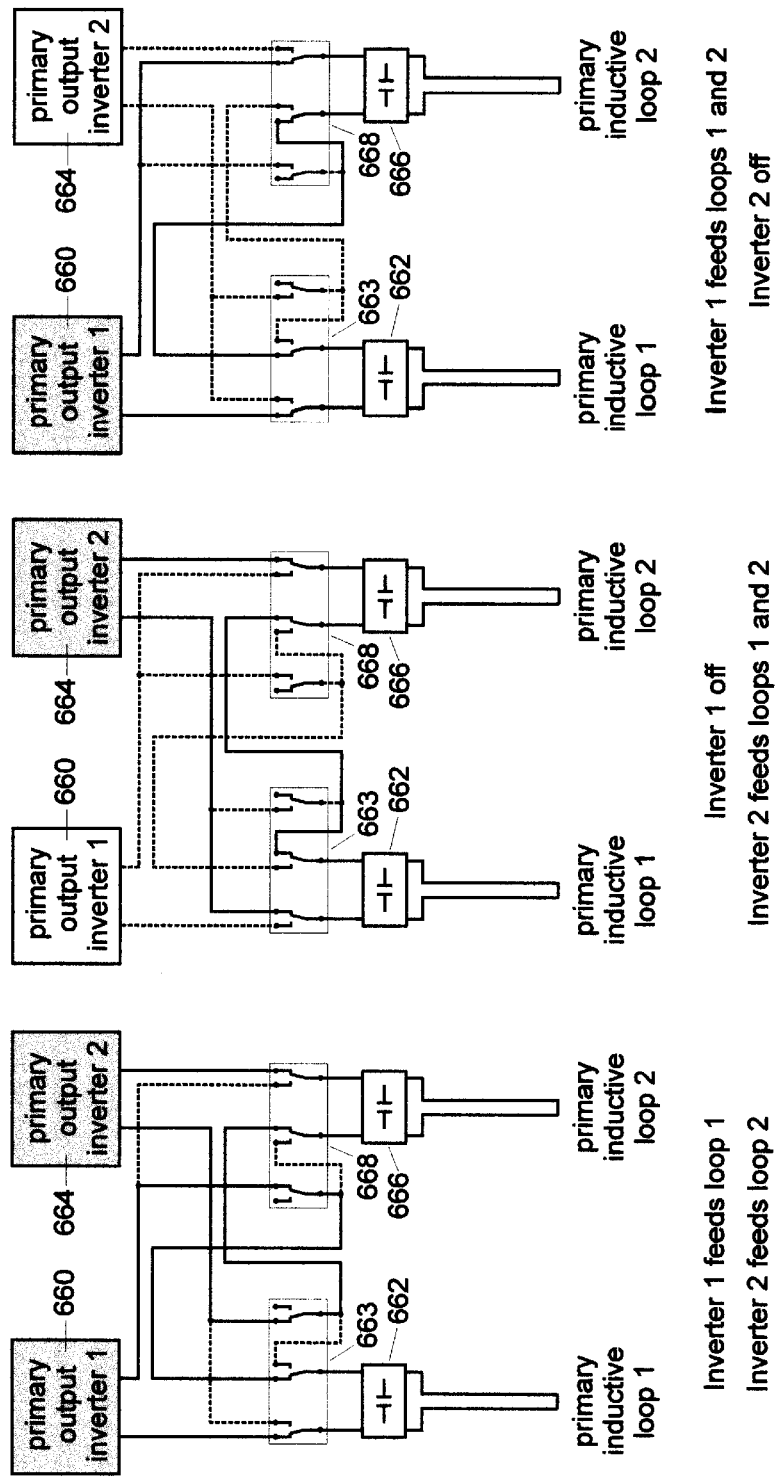
FIGS. 13A–C are switching diagrams of a preferred embodiment of the invention having a multiple-zone primary configuration.

FIGS. 13A–C are switching diagrams of a preferred embodiment of the invention having a multiple-zone primary configuration. FIG. 13A shows the default condition, where a first inverter 660 drives a first zone 662 in accordance with the positions of the switch 663, and a second inverter 664 drives a second zone 666 in accordance with the positions of the switch 668. FIG. 13B shows a first failure condition, where the first inverter 660 fails and the second inverter 664 drives the first zone 662 and the second zone 666. The first inverter 660 is switched out in accordance with the switch 663, which also connected the first zone 662 to the second inverter 664. FIG. 13C shows a second failure condition, where the second inverter 664 fails and the first inverter 660 drives the first zone 662 and the second zone 666. The second inverter 664 is switched out in accordance with the switch 668, which also connected the second zone 666 to the first inverter 660.

FIG. 1 is a schematic drawing of the components and subsystems of a preferred embodiment of the invention. The contactless power transfer system 90 includes a power supply 100, a primary 200, a first pick-up 300, a second pick-up 400, a and a load element 500. As will be clearly understood by those skilled in the art, additional pick-ups, identical to first and second pick-ups 300 and 400, can be added to the contactless power transfer system 90 without affecting the following description. The power supply 100 includes a constant current controlled chopper that includes a transistor switch 104, an inductance 103, a sensor 102, a constant current control 101 and a rectifier 106. The transistor switch 104 controls the current that passes through the inductance 103 and the sensor 102 in response to a control signal produced by the constant current control 101. The control signal produced by the constant current control 101 is determined by a sensor signal that is produced by the sensor 102. A DC-input capacitor 105 smoothens reflections to the DC-input voltage. A capacitor 107 smoothens the voltage output of the constant current controlled chopper. The power supply 100 also includes a high frequency inverter that includes the transistor switches 108, 109, 110, and 111. Each of the transistor switches 108–111 includes the parallel combination of a diode with a transistor that is controlled by a conventional controller (not shown). The controller switches the transistor switches 108–111 at the ringing frequency of the primary 200 and first and second pick-ups 300 and 400. The ringing frequency is usually in the range of 10 kHz to 20 kHz.

The primary 200 is formed as a loop having two legs 200a and 200b, and includes a number of turns. The primary 200 is inductively coupled to one or more of the first and second pick-ups 200 and 300. The primary 200 is also connected to the power supply 100 through series capacitors 201 and 202. The series capacitors 201 and 202 are tuned to the same ringing frequency as the first and second pick-ups 300 and 400. Accordingly, the power factor of the contactless power transfer system 90 is always set to one regardless of the actual output power.

Figure 2:
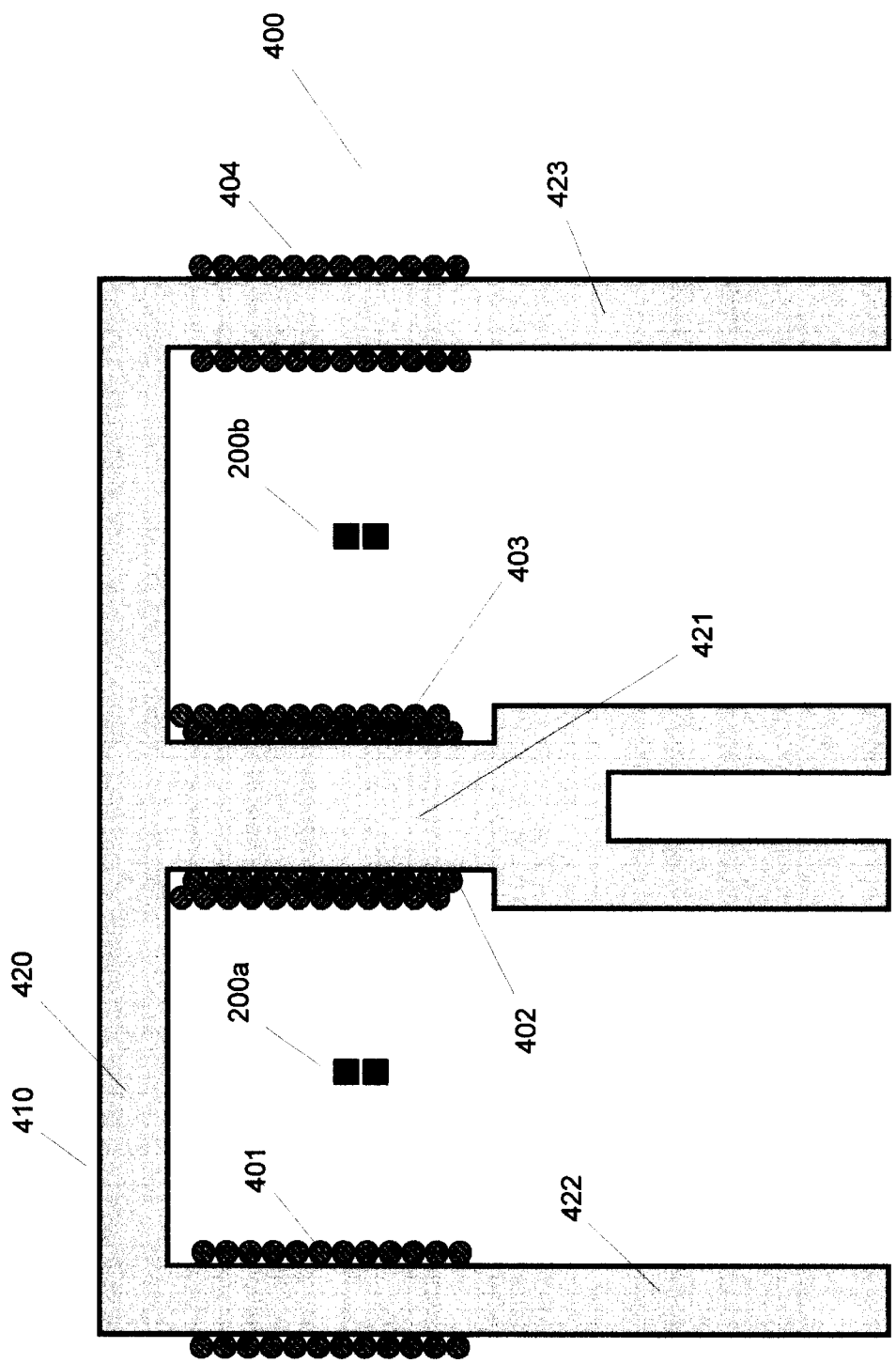
FIG. 2 is a cross-sectional view of a pick-up coil in accordance with a preferred embodiment of the invention.

The first and second pick-ups 300 and 400 are identical. Accordingly, only the second pick-up 400 will be described in the following. The second pick-up 400 is also shown in FIG. 2, which is a cross-sectional view of a pick-up coil in accordance with a preferred embodiment of the invention. The second pick-up 400 includes an E-shaped ferrite iron core 410 having a middle yoke 421 and two side yokes 422 and 423. The second pickup 400 also includes a first winding 412 and a second winding 414. The first winding 412 includes the winding 401 (which is wound around the side yoke 422) and the winding 402 (which is wound around the middle yoke 421). The second winding 414 includes the winding 404 (which is wound around the side yoke 423) and the winding 403 (which is wound around the middle yoke 421). The leg 200a of the primary 200 passes between the middle yoke 421 and the side yoke 422. The leg 200b of the primary 200 passes between the middle yoke 421 and the side yoke 423. The first winding 412 is connected in parallel with a capacitor 405 to form a first resonant circuit. The second winding 414 is connected in parallel with a capacitor 406 to form a second resonant circuit. Each of the first and second resonant circuits is tuned to the ringing frequency. The first and second resonant circuits are connected to portions of a bridge rectifier 407 connected in parallel at the DC-output of the first and second pick-ups 300 and 400.

The DC-outputs of the first and second pick-ups 300 and 400 are connected together in parallel on a secondary loop 490 along with the load element 500. The load element 500 includes an inductance 501, a capacitor 502, and a load 503. The load element 500 can also include a boost-converter 504. The DC-output voltage from the first and second pick-ups 300 and 400 is smoothened by the inductance 501 and the capacitor 502. In case there are several pick-ups such as first pick-ups 300 and 400 connected to the secondary, the boost-converter 504 can be included in the load element 500 to keep a constant output voltage at the load 503. This compensates for the effect of individual loads.

Figure 30:
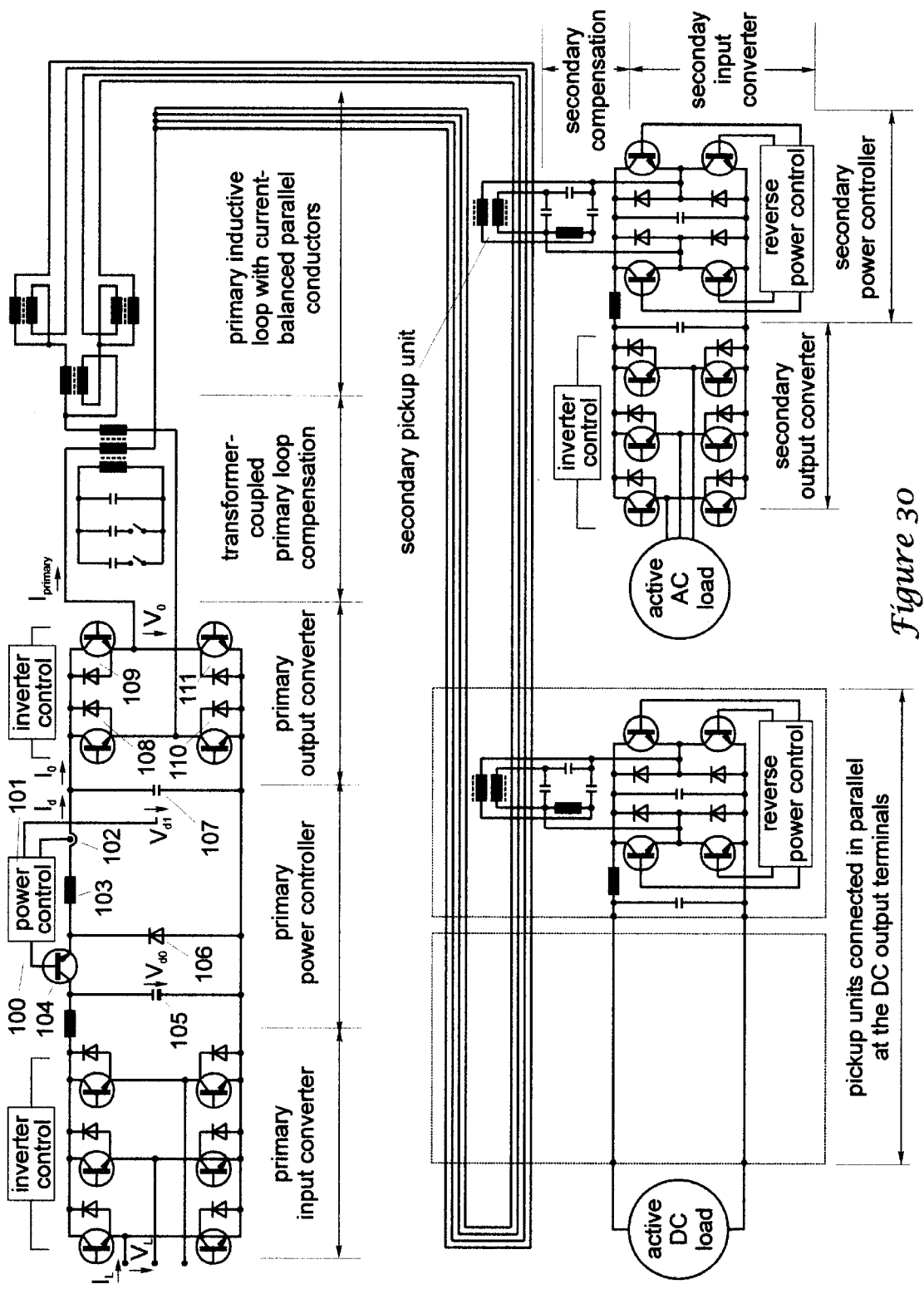
FIG. 30 is a detailed schematic diagram of a preferred embodiment of the present invention.

FIG. 30 is a detailed schematic diagram of a preferred embodiment of the present invention. On the primary side the primary energy converter includes the controlled input inverter, the intermediate power controller, and the controlled output inverter.

The input inverter is required only if the primary power source is AC. If rectifies the incoming power and through the filter capacitor and inductor establish a smooth and constant intermediate DC voltage link. Depending on whether the secondary system has one or multiple loads, the intermediate output controller supplies the output inverter with constant voltage or constant current. The controlled output inverter converts the intermediate DC power to a high frequency output at up to 30 kHz and applies it to the primary inductive loop.

The primary loop is shown as four parallel conductors with current balancing transformers, as described in another Figure. the loop is compensated to unity power, in this case by concentrated transformer-coupled capacitors as described previously.

The first secondary system has an active AC load so the secondary energy converter will consist of a controlled input inverter, an intermediate power controller, and an output inverter. The pickup coil is adaptively compensated to unity power factor and supplies constant voltage in-phase power to the input inverter where it is rectified and smoothed and sent to the output inverter for delivery to the load. When the load becomes active the rectifier section of the output inverter converts the AC to DC and the reverse power control of the intermediate power controller manages reverse power flow back to the primary as previously described.

The second secondary system has an active DC load so the secondary energy converter does not include an output inverter.

Another important aspect of the invention is shown; that is, two pickup coils are connected in parallel at the DC output in order to increase power transfer. The reverse power control is essentially the same as for the AC load.

Figure 11:
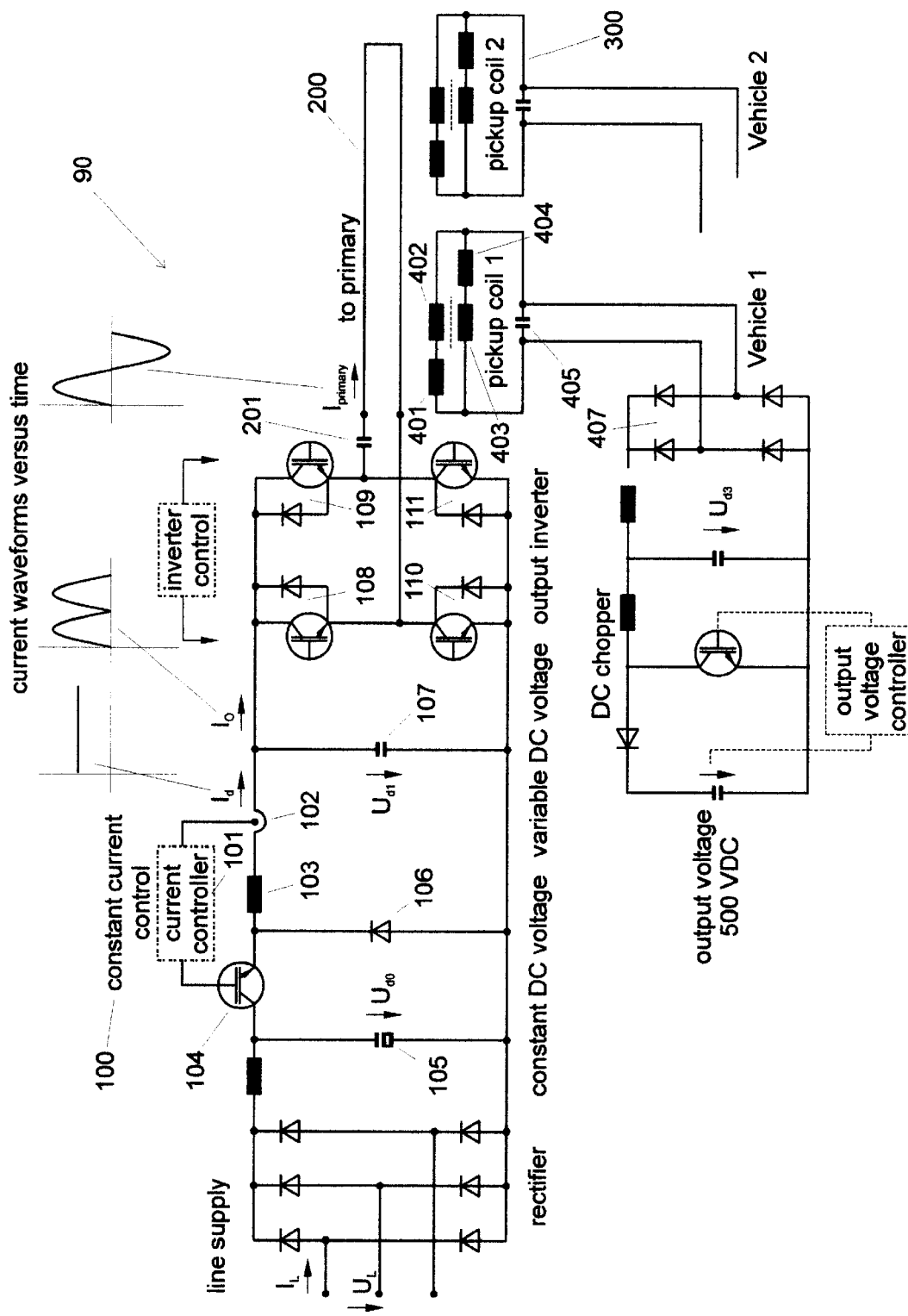
FIG. 11 is another schematic diagram of a preferred embodiment of the invention.

FIG. 11 is another schematic diagram of a preferred embodiment of the invention. The components are given the same reference numbers as they are given in FIGS. 1 and 2.

Figure 14:
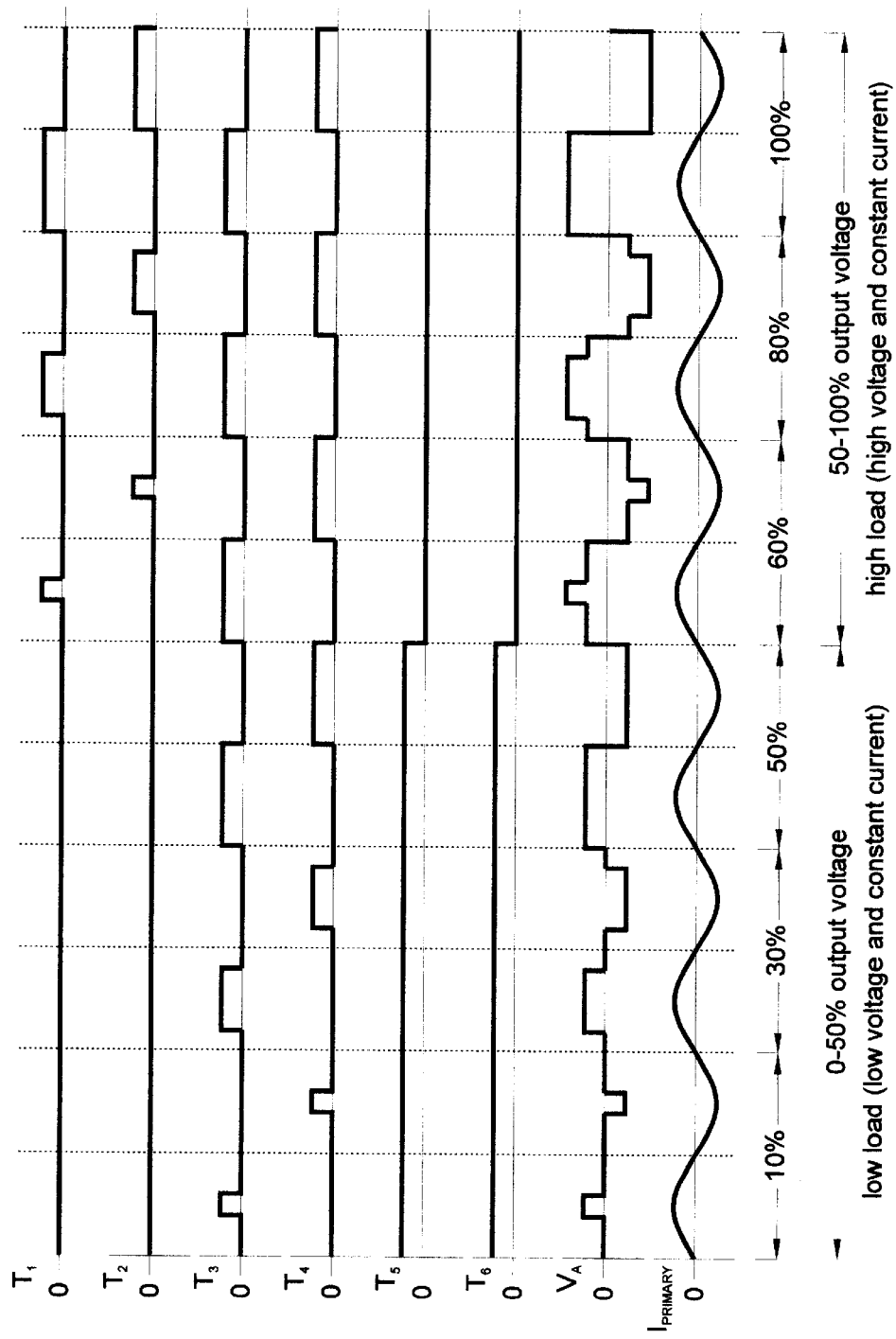
FIG. 14 is a timing diagram illustrating the principle of current control of a multiple vehicle power supply in accordance with a preferred embodiment of the invention.

FIG. 14 is a timing diagram illustrating the principle of current control of a multiple vehicle power supply in accordance with a preferred embodiment of the invention, as shown in FIGS. 12A–E and FIGS. 13A–C.

Figure 15:
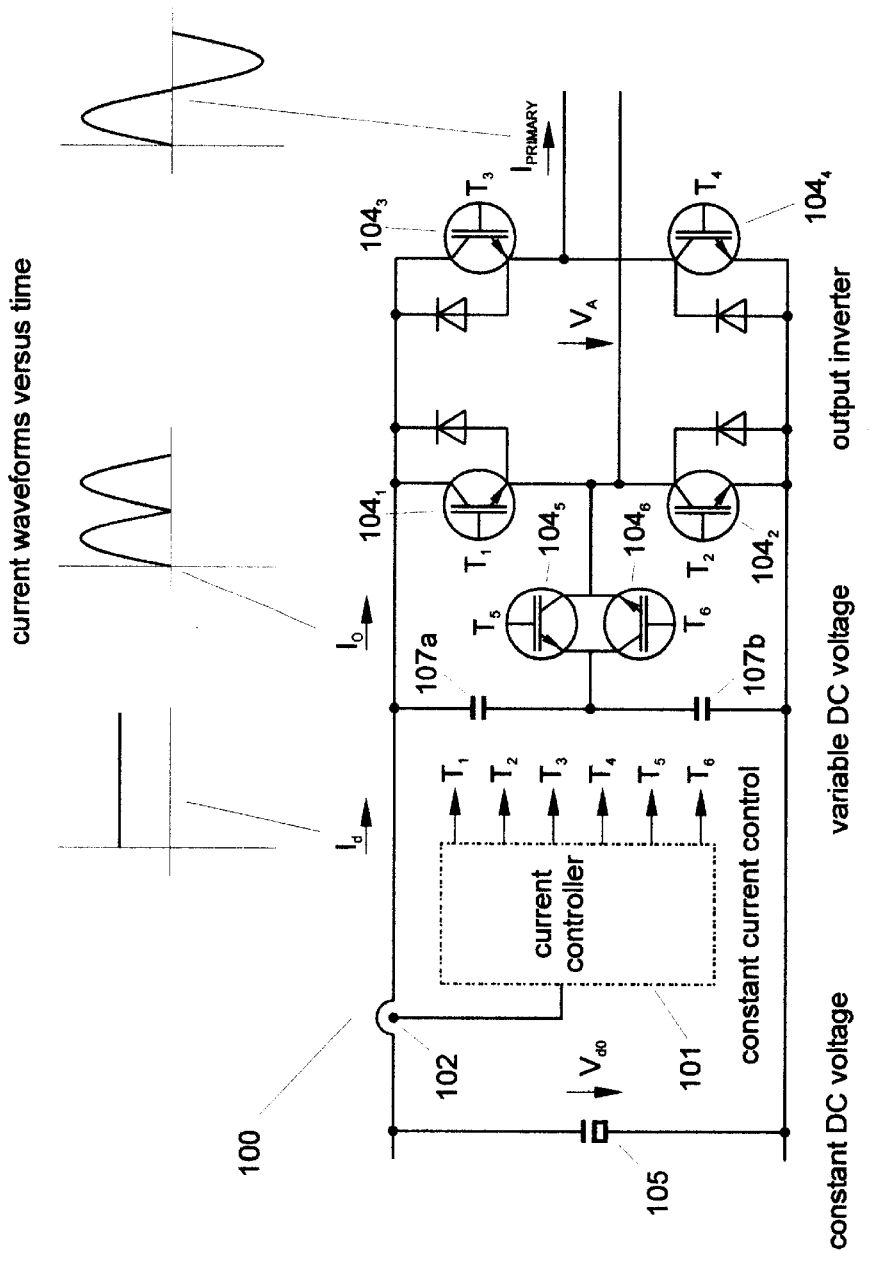
FIG. 15 is a schematic diagram illustrating the principle of current control of a multiple vehicle power supply in accordance with a preferred embodiment of the invention.

FIG. 15 is a schematic diagram illustrating the principle of current control of a multiple vehicle power supply in 30 accordance with a preferred embodiment of the invention. Where appropriate, components are given the same reference numbers as they have in FIGS. 1 and 2. The transistors 1041–1046 are driven by the waveforms respectively labeled as $T_1$–$T_6$ in FIG. 14. Otherwise, the components shown in FIG. 15 will be understood by those skilled in the art.

Figure 17A:
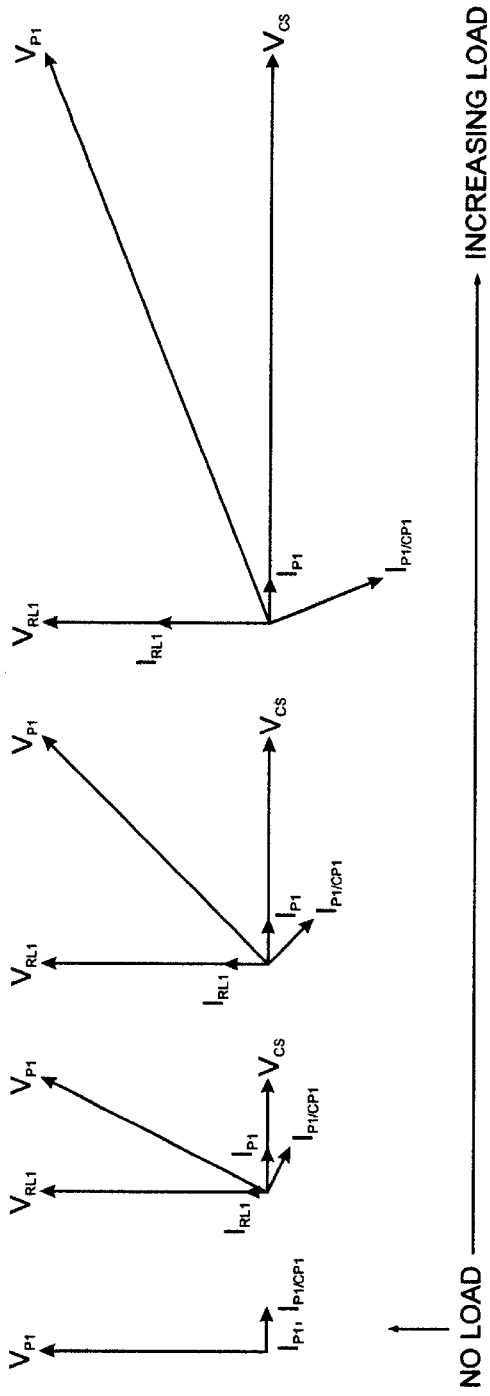
FIG. 17A is a schematic diagram explaining the invariant real voltage and real current of the present invention.

FIG. 17A is a schematic diagram explaining the invariant real voltage and real current of the present invention. FIG. 17A shows four vector diagrams, which relate to increasing loads. The no-load condition is shown on the left hand side of FIG. 17A while a large load is shown in the right hand side of FIG. 17A. Intermediate levels of load are shown in the middle of FIG. 17A. Under the conditions shown in the circuit of FIGS. 16A and 16B, the vectors represent voltages and currents shown in FIGS. 16A and 16B. The most significant point illustrated by FIG. 17A is that, even though the voltage induced across either of the coils 702 and 704 may vary in both magnitude and phase angle, the real component of this voltage (i.e., its projection on the vertical axis) is invariant. Likewise, the real component of the currents through the coils 702 and 704 (i.e., their projection on the horizontal axis) are invariant.

Figure 17B:
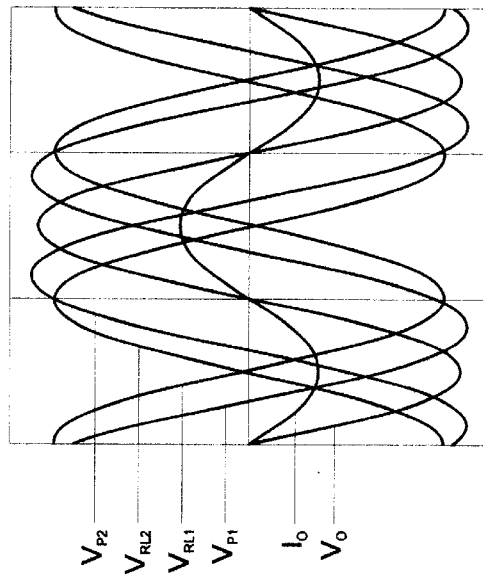
FIG. 17B is a timing diagram showing the phase relationships of the various voltages and currents in a preferred embodiment of the present invention.

FIG. 17B is a timing diagram showing the phase relationships of the various voltages and currents in a preferred embodiment of the present invention. The voltage V0 and the current I0 are in phase, because the circuit shown in FIGS. 16A and 16B presents a real (i.e., non-inductive and non-capacitive) impedance. The voltages $V_{P1}$, $V_{P2}$, $V_{RL1}$ and $V_{RL2}$ have various phases.

FIGS. 31A–B are schematic diagrams of additional aspects of the series compensation of the primary inductive loop of the present invention. FIG. 31A shows a two-turn primary loop which is compensated with capacitors which are distributed along the loop. FIG. 31B shows the same two-turn primary loop in which the compensation is accomplished by a concentrated group of parallel capacitors which can be switched in and out of the circuit to increase or decrease the total capacitance. The capacitor group is transformer-coupled to each of the loop legs and tuning is facilitated by simply adjusting the number of windings of each of the transformer coils.

Figure 18:
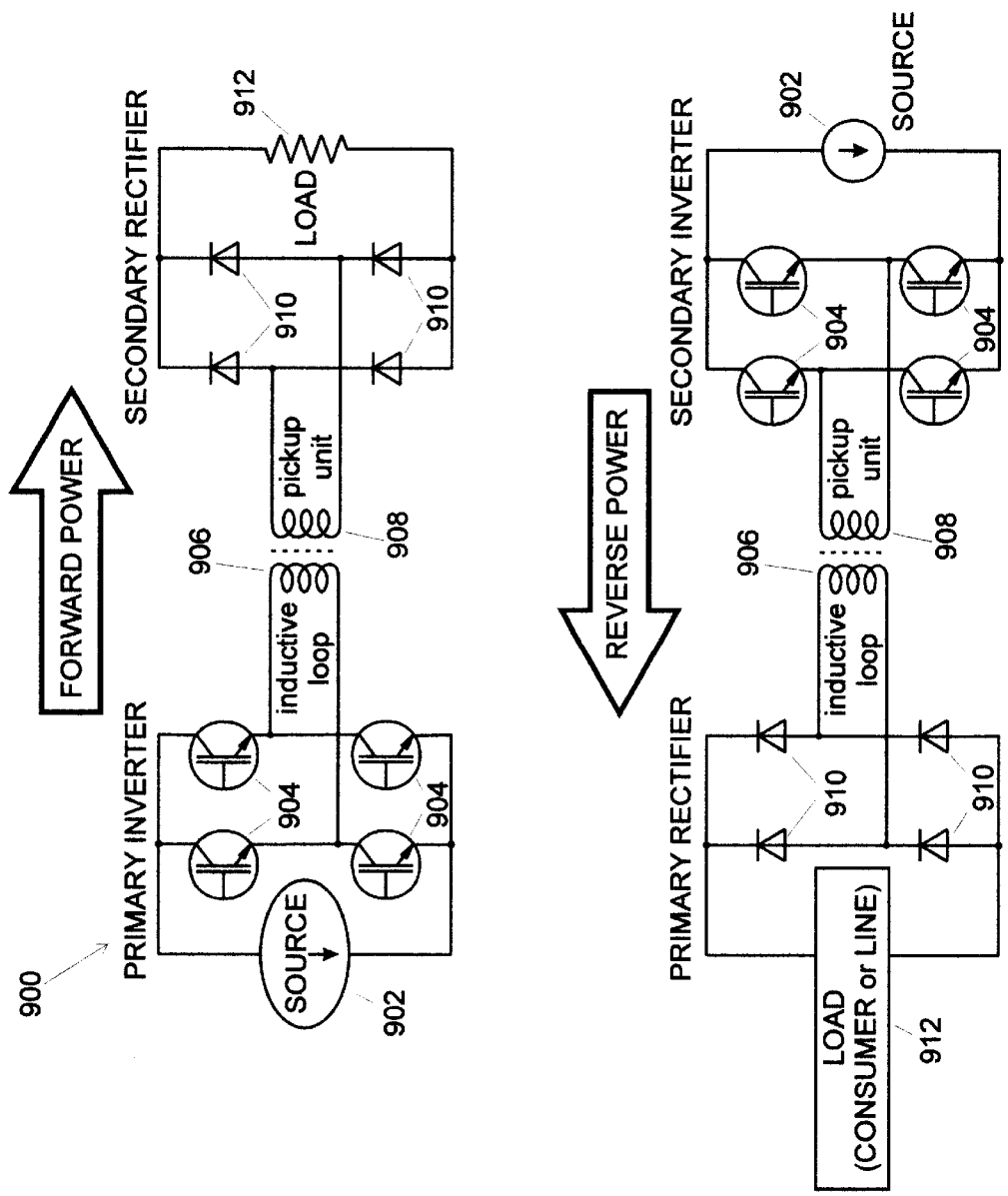
FIGS. 18A–B are schematic diagrams showing the ability of the present invention to operate in both forward power and reverse power modes, invariant real voltage and real current of the present invention.

FIGS. 18A–B are schematic diagrams showing the ability of the present invention to operate in both forward power and reverse power modes. This is well understood by those skilled in the relevant arts, because control of a primary inverter 900 including a current source 902 and control transistors 904 generates electrical power which passes through a primary coil 906 that is coupled to a pickup (secondary) coil 908. The magnetic field induced in the primary coil 906 induces a voltage across the pickup coil 908, which is then rectified by the diode bridge including the diodes 910, and the resulting DC power is passed to the load 912. By symmetry, power can be transferred in the reverse direction, since the circuit shown in the lower portion of FIG. 18 is configured to be a mirror image of that shown in the upper portion of FIG. 18. In the lower portion of FIG. 18, the current source 902 is controlled by the control transistors 904 to generate electrical power which passes through the pickup coil 908 to the primary coil 906 where it is rectified by the diode bridge including the diodes 910. The resulting DC power is passed to the load 912 (which may be the line, or another consumer, such as a load in another zone).

Figure 19:
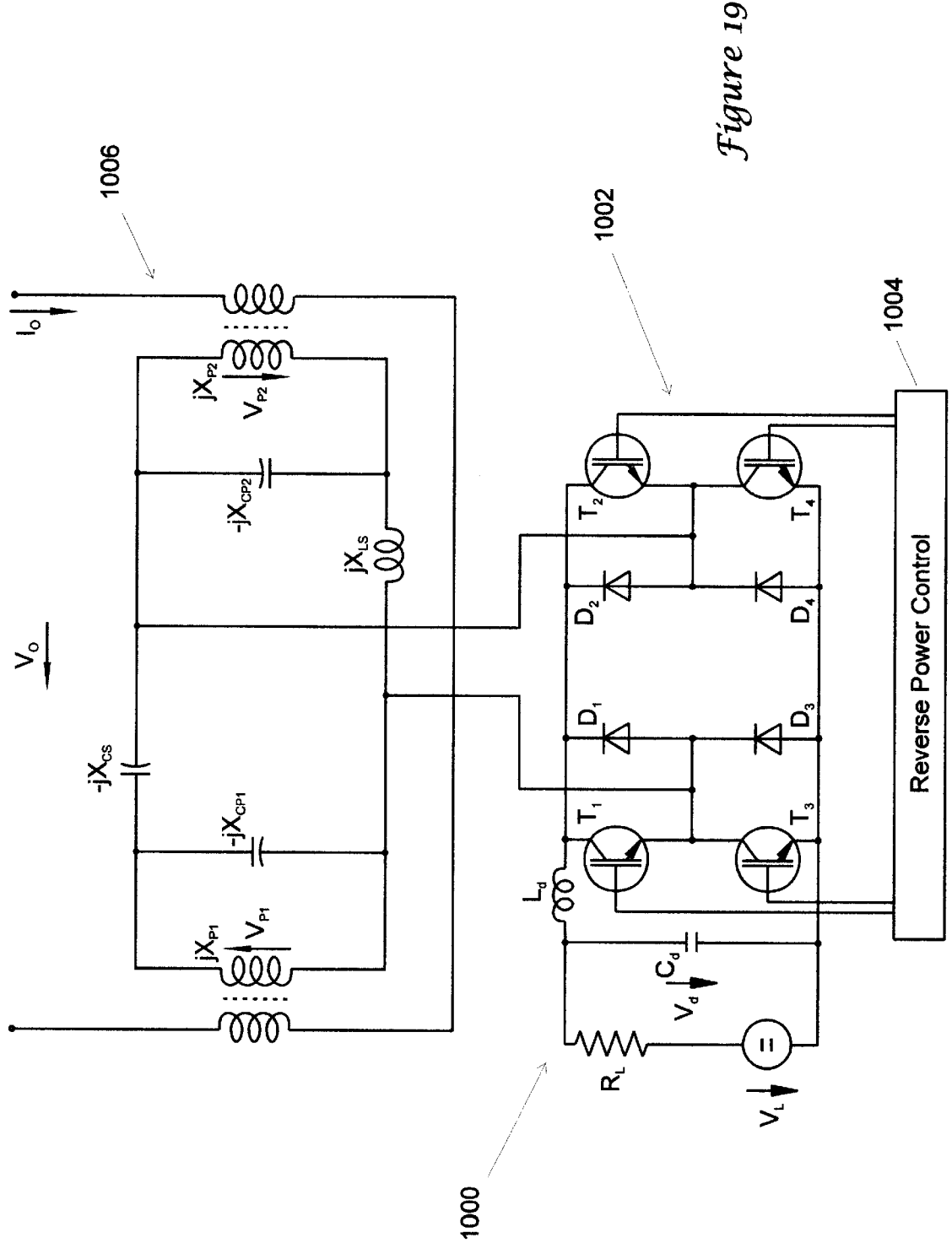
FIG. 19 is a schematic diagram showing a practical implementation of a preferred embodiment of the present invention.

FIG. 19 is a schematic diagram showing a practical implementation of a preferred embodiment of the present invention. The circuit 1000 shows a controlled load 1002 that is being driven by the circuit shown in FIG. 16B (which is equivalent to the circuit shown in FIG. 16A). On the other hand, as will be understood by those skilled in the relevant arts, the controlled load 1002 can be seen to incorporate both of the circuits (i.e., forward and reverse power) shown in FIG. 18. In other words, depending upon how the reverse power control circuit 1004 activates the transistors T1, T2, T3 and T4, one of two possible situations exists. In one situation, power flows from the line to which the coil circuit 1006 is connected to the load 1002 because diodes D1, D2, D3 and D4 rectify the power received (I.e., the transistors T1, T2, T3 and T4 are turned off). In the other situation, power flows from the load 1002 to the line to which the circuit 1006 is connected because diodes D1, D2, D3 and D4 are shorted out by turning on the transistors T1, T2, T3 and T4. If another controlled load like controlled load 1002 is connected to the primary circuit carrying the voltage $V_0$, that controlled load can be configured to receive power from the circuit 1000. Otherwise, the power flowing from the circuit 1000 is transferred back to the power source supplying the voltage $V_0$ and the current $I_0$.

While the foregoing is a detailed description of the preferred embodiment of the invention, there are many alternative embodiments of the invention that would occur to those skilled in the art and which are within the scope of the present invention. Accordingly, the present invention is to be determined by the following claims.

What is claimed is:

1. A contactless system to magnetically transfer electric power from an input power source to a first secondary load, comprising:

a primary energy converter connected to the input power source and including an output inverter;

a primary inductive loop connected in series to the output inverter through at least one primary capacitor, the loop including at least one turn;

a secondary power pickup unit magnetically coupled to the primary inductive loop, the secondary power pickup unit including a ferromagnetic core and at least two windings which are each distributed on the ferromagnetic core such that they are partly magnetically coupled and partly magnetically not coupled, the two windings each being partly compensated with a parallel capacitor;

compensation circuitry that automatically and passively compensates the two windings to unity power factor and passively supplies in-phase power at a constant voltage to the first secondary load regardless of the magnitude of the first secondary load; and a secondary energy converter connected to the secondary power pickup unit through at least one secondary capacitor in parallel to the secondary power pickup unit, the secondary energy converter including an input converter and being connected to the first secondary load, the at least one primary capacitor and the at least one secondary capacitor being chosen so that the primary inductive loop and the secondary power pickup unit are tuned to resonance at a desired operating frequency, whereby the primary inductive loop and the secondary power pickup unit are magnetically coupled at a unity power factor.

2. A contactless inductive system to transfer electric power from a primary system to a first load and at least one additional load, the contactless inductive system having a power factor, comprising:

a first power pickup unit having two segmented windings which are partly magnetically coupled and partly magnetically not coupled, each of the two windings being connected with a resonant capacitor in parallel, so that the first power pickup unit is tuned to a desired operating frequency;

a first inverter which is set at the desired operating frequency, the first inverter feeding the primary system with constant voltage or constant current and maintaining the power factor of the contactless inductive system equal to one, independent of the first load;

a primary inductive loop which is formed as a loop and connected to a first primary inverter through one or more capacitors in series, the primary inductive loop being tuned at the desired operating frequency, the primary inductive loop being separated into at least two power zones, each of the first and additional loads being located in a separate power zone, each of the power zones being independently and automatically switchable from an active mode to an inactive mode, such that each inactive zone is magnetically neutral and is incapable of transferring electric power to any load in that inactive zone, all loads thereby being connected in parallel, seeing the same voltage, and eliminating the multiple series load reflected impedances; and a constant current power supply feeding the inverter, wherein the system transfers electric power to at least one load in addition to the first load.

3. The contactless inductive system of claim 2, further including at least one additional inverter and a switching system, the switching system allowing an inverter feeding a power zone to load-share an adjoining power zone in the event one of the inverters fails.

4. The contactless inductive system of claim 2, wherein at least one of the first and additional loads includes a voltage control circuit for maintaining a constant voltage to at least one of the first and additional loads.

* * * * *